(12) United States Patent
Ueda

(10) Patent No.: US 12,281,932 B2
(45) Date of Patent: Apr. 22, 2025

(54) ABNORMAL SOUND IDENTIFICATION DEVICE, ABNORMAL SOUND IDENTIFICATION METHOD, AND NON-TRANSITORY STORAGE MEDIUM

(71) Applicant: TOYOTA JIDOSHA KABUSHIKI KAISHA, Toyota (JP)

(72) Inventor: Yu Ueda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 515 days.

(21) Appl. No.: 17/860,321

(22) Filed: Jul. 8, 2022

(65) Prior Publication Data

US 2023/0012559 A1    Jan. 19, 2023

(30) Foreign Application Priority Data

Jul. 13, 2021    (JP) .................. 2021-115923

(51) Int. Cl.
*G01H 3/08*    (2006.01)
*G01H 3/06*    (2006.01)
*G06N 3/08*    (2023.01)

(52) U.S. Cl.
CPC .......... *G01H 3/08* (2013.01); *G01H 3/06* (2013.01); *G06N 3/08* (2013.01)

(58) Field of Classification Search
CPC .......... G01H 1/003; G01H 17/00; G01H 3/00; G01H 3/04; G01H 3/06; G01H 3/08;
(Continued)

(56) References Cited

U.S. PATENT DOCUMENTS

| | | |
|---|---|---|
| 2007/0032968 A1 | 2/2007 | Nakamura |
| 2019/0114849 A1 | 4/2019 | Lee et al. |

(Continued)

FOREIGN PATENT DOCUMENTS

| | | | | |
|---|---|---|---|---|
| CN | 105705928 A | * | 6/2016 | .......... G01M 13/045 |
| JP | 2004264975 A | * | 9/2004 | .......... G05B 19/418 |

(Continued)

OTHER PUBLICATIONS

Daihatsu Motor Co Ltd, "Daihatsu Uses AI (Artificial Intelligence) to Enhance Competitiveness" [online, searched on Oct. 27, 2024], Daihatsu Motor Co Ltd Website, Mar. 4, 2021, Internet URL: https://www.daihatsu.com/jp/news/2021/20210304-1.html (with partial English translation of Office Action issued to Corresponding Japanese Patent Application No. JP2021-115923A for relevance).

(Continued)

*Primary Examiner* — David L Singer
(74) *Attorney, Agent, or Firm* — Dinsmore & Shohl LLP

(57) ABSTRACT

An abnormal sound identification device includes an arithmetic device and an output device. The arithmetic device is configured to identify frequency-time data recorded in a vehicle, specify a first time range and a second time range in the frequency-time data, input the frequency-time data to the trained model to cause the trained model to identify an abnormal sound generated in the first time range as a first abnormal sound based on the input frequency-time data and cause the trained model to identify an abnormal sound generated in the second time range as a second abnormal sound, and cause the output device to output a kind of the first abnormal sound with the kind not matching a kind of the second abnormal sound among the first abnormal sounds.

5 Claims, 18 Drawing Sheets

(58) Field of Classification Search
CPC .. G01M 13/028; G01M 13/045; G01M 15/12; G06N 3/0464; G06N 3/08; G07C 5/0808
See application file for complete search history.

(56) References Cited

U.S. PATENT DOCUMENTS

| | | | |
|---|---|---|---|
| 2019/0295568 A1 | | 9/2019 | Sudo |
| 2021/0304785 A1* | | 9/2021 | Ninomiya ................ G01H 3/08 |
| 2023/0325640 A1* | | 10/2023 | Thewes .................... G06N 3/09 |
| | | | 706/21 |

FOREIGN PATENT DOCUMENTS

| | | | | |
|---|---|---|---|---|
| JP | 2005-098984 A | | 4/2005 | |
| JP | 2017-110919 A | | 6/2017 | |
| JP | 2019-164107 A | | 9/2019 | |
| KR | 20170108085 A | * | 9/2017 | ............. G01H 13/00 |

OTHER PUBLICATIONS

Goo-Net Magazine, "Strange Noises From Cars! A Thorough Explanation of the Causes of Strange Noises and Malfunctions of Cars and Their Remedies!" [online, searched on Oct. 27, 2024], Goo-Net Magazine, Mar. 31, 2021, Internet URL: https://www.goonet.com/magazine/knowhow/drive/38855/ (with partial English translation of Office Action issued to Corresponding Japanese Patent Application No. JP2021-115923A for relevance).

* cited by examiner

| ABNORMAL | COMPONENT (GENERATION SOURCE) |
|---|---|
| ABNORMAL A | VSV |
| ABNORMAL B | ALTERNATOR |
| ABNORMAL C | WATER PUMP |
| ABNORMAL D | TURBO |

ABNORMAL SOUND IDENTIFICATION DEVICE, ABNORMAL SOUND IDENTIFICATION METHOD, AND NON-TRANSITORY STORAGE MEDIUM

CROSS-REFERENCE TO RELATED APPLICATION

This application claims priority to Japanese Patent Application No. 2021-115923 filed on Jul. 13, 2021, incorporated herein by reference in its entirety.

BACKGROUND

1. Technical Field

An aspect of the disclosure relates to an abnormal sound identification device, an abnormal sound identification method, and a non-transitory storage medium.

2. Description of Related Art

Japanese Unexamined Patent Application Publication No. 2017-110919 discloses a technique that identifies an abnormal sound from a sound recorded by an image forming device. In the disclosure, the sound recorded by the image forming device is converted into frequency-time data indicating the temporal change of the frequency spectrum. Further, fast Fourier transform is performed on the frequency-time data in the time axis direction. A user identifies a kind of the abnormal sound (for example, the generation source of the abnormal sound) based on the analysis result of the fast Fourier transform and the database of the abnormal sound generated in the past.

SUMMARY

As described above, in Japanese Unexamined Patent Application Publication No. 2017-110919, a user (that is, a person) identifies an abnormal sound. On the other hand, the inventors of the disclosure are conducting an experiment in which an abnormal sound is identified by artificial intelligence from a sound recorded in a vehicle. In the experiment, the abnormal sound that is not actually generated may be identified by artificial intelligence. The present specification proposes a technique that identifies an abnormal sound using artificial intelligence with high precision.

An abnormal sound identification device according to a first aspect of the disclosure includes an arithmetic device configured to access a trained model of artificial intelligence and an output device. The arithmetic device is configured to identify frequency-time data that indicates a temporal change of a frequency spectrum of a sound recorded in a vehicle, specify a first time range and a second time range different from the first time range in the frequency-time data, input the frequency-time data to the trained model to cause the trained model to identify one or more abnormal sounds generated in the first time range as a first abnormal sound based on the input frequency-time data and cause the trained model to identify one or more abnormal sounds generated in the second time range as a second abnormal sound based on the input frequency-time data, and cause the output device to output a kind of the first abnormal sound with the kind not matching a kind of the second abnormal sound among the first abnormal sounds.

In the first aspect of the disclosure, the arithmetic device may be configured not to, in a case of causing the output device to perform output, cause the output device to output the kind of the first abnormal sound with the kind matching the kind of the second abnormal sound among the first abnormal sounds.

In the first aspect of the disclosure, a sound pressure level of the sound in the first time range may be higher than a sound pressure level of the sound in the second time range.

In the above-mentioned "identifying frequency-time data that indicates a temporal change of a frequency spectrum of a sound recorded in a vehicle", any aspect may be taken as long as the frequency-time data is identified (that is, recognized) by the arithmetic device. For example, the arithmetic device may calculate the frequency-time data based on the sound recorded in the vehicle, or the frequency-time data calculated outside the arithmetic device may be input to the arithmetic device.

Further, the above-mentioned "trained model" may be anywhere as long as the trained model can be accessed by the arithmetic device. For example, the trained model may be stored in a storage device inside the abnormal sound identification device, or may be stored in a storage device on the network accessible by the arithmetic device.

Further, the specification of the "first time range" and the "second time range" may be carried out according to the input from the user, or may be carried out independently by the arithmetic device according to a predetermined algorithm.

According to the first aspect of the disclosure, when the arithmetic device identifies the frequency-time data, the arithmetic device specifies the first time range and the second time range in the frequency-time data. As the first time range, a time range in which an abnormal sound is likely to be generated can be specified, and as a second time range, a time range in which an abnormal sound is unlikely to be generated can be specified. Next, the arithmetic device inputs the frequency-time data to the trained model to cause the trained model to identify one or more abnormal sounds generated in the first time range as a first abnormal sound and cause the trained model to identify one or more abnormal sounds generated in the second time range as a second abnormal sound. Next, the arithmetic device causes the output device to output a kind of the first abnormal sound with the kind not matching a kind of the second abnormal sound among the first abnormal sounds. Since it is highly possible that no abnormal sound is generated in the second time range, it is highly possible that the second abnormal sound is an abnormal sound that is not recognized by a person. Therefore, it is highly possible that the first abnormal sound with a kind matching that of the second abnormal sound among the first abnormal sounds is also an abnormal sound that is not recognized by the person. Since the arithmetic device causes the output device to output the kind of the first abnormal sound with the kind not matching the second abnormal sound among the first abnormal sounds, it is possible to display the abnormal sound recognized by a person on the output device. As described above, according to the first aspect of the disclosure, it is possible to identify a kind of an abnormal sound included in the sound recorded in the vehicle with higher precision.

A second aspect of the disclosure relates to an abnormal sound identification method of identifying an abnormal sound from a sound recorded in a vehicle using an arithmetic device configured to access a trained model of artificial intelligence and an output device. The abnormal sound identification method includes identifying, by the arithmetic device, frequency-time data that indicates a temporal change of a frequency spectrum of the sound, specifying, by the arithmetic device, a first time range and a second time range different from the first time range in the frequency-time data, inputting, by the arithmetic device, the frequency-time data to the trained model to cause the trained model to identify one or more abnormal sounds generated in the first time range as a first abnormal sound based on the input frequency-time data and cause the trained model to identify one or more abnormal sounds generated in the second time range as a second abnormal sound based on the input frequency-time data, and causing, by the arithmetic device, the output device to output a kind of the first abnormal sound with the kind not matching a kind of the second abnormal sound among the first abnormal sounds.

A third aspect of the disclosure relates to a non-transitory storage medium storing instructions that are executable in one or more arithmetic devices configured to access a trained model of artificial intelligence and connected to an output device, the instructions causing the one or more arithmetic devices to perform following functions. The non-transitory storage medium includes identifying frequency-time data that indicates a temporal change of a frequency spectrum of a sound recorded in a vehicle, specifying a first time range and a second time range different from the first time range in the frequency-time data, inputting the frequency-time data to the trained model 52 to cause the trained model to identify one or more abnormal sounds generated in the first time range as a first abnormal sound based on the input frequency-time data and cause the trained model to identify one or more abnormal sounds generated in the second time range as a second abnormal sound based on the input frequency-time data, and causing the output device to output a kind of the first abnormal sound with the kind not matching a kind of the second abnormal sound among the first abnormal sounds.

An abnormal sound identification device according to a fourth aspect of the disclosure includes an arithmetic device configured to access a trained model of artificial intelligence, a storage device configured to store corresponding data in which a kind of an abnormal sound is associated with a component of a vehicle, and an output device. The arithmetic device is configured to identify frequency-time data indicating a temporal change in a frequency spectrum of a sound recorded in the vehicle and component operating state data indicating a temporal change of an operating state of the component of the vehicle during recording of the sound, input the frequency-time data to the trained model to cause the trained model to identify an abnormal sound included in the sound as an identified abnormal sound based on the input frequency-time data, and identify a corresponding component that is the component associated with the identified abnormal sound in the corresponding data, identify an operating time zone of the corresponding component based on the component operating state data of the corresponding component, and determine whether to cause the output device to output a kind of the identified abnormal sound in determination processing including determining whether a generation time zone of the identified abnormal sound and the operating time zone of the corresponding component overlap as at least one of determination elements.

Identifying the above-mentioned "frequency-time data that indicates a temporal change of a frequency spectrum of a sound recorded in the vehicle" may be performed in any way as long as the frequency-time data is identified (that is, recognized) by the arithmetic device. For example, the arithmetic device may calculate the frequency-time data based on the sound recorded in the vehicle, or the frequency-time data calculated outside the arithmetic device may be input to the arithmetic device.

Further, identifying the "component operating state data indicating a temporal change of the operating state of the component of the vehicle during recording of the sound" may be performed in any way as long as the component operating state data is identified (that is, recognized) by the arithmetic device. For example, the component operating state data may be input to the arithmetic device from the outside.

Further, the above-mentioned "trained model" may be anywhere as long as the trained model can be accessed by the arithmetic device. For example, the trained model may be stored in a storage device inside the abnormal sound identification device, or may be stored in a storage device on the network accessible by the arithmetic device.

In the abnormal sound identification device, the arithmetic device inputs the frequency-time data to the trained model to cause the trained model to identify an abnormal sound included in the sound recorded in the vehicle as an identified abnormal sound. Then, the arithmetic device identifies the corresponding component associated with the identified abnormal sound by the corresponding data. The arithmetic device identifies an operating time zone of the corresponding component based on the component operating state data of the corresponding component. Further, the arithmetic device performs determination processing including determining whether a generation time zone of the identified abnormal sound and the operating time zone of the corresponding component overlap as at least one of determination elements. When the generation time zone of the identified abnormal sound and the operating time zone of the corresponding component do not overlap, it is highly possible that the identified abnormal sound is erroneously detected by the trained model. Therefore, by determining whether to cause the output device to output the kind of the identified abnormal sound by the determination processing, the kind of the abnormal sound generated in the output device can be correctly displayed. As described above, according to the abnormal sound identification device of the fourth aspect of the disclosure, it is possible to identify a kind of an abnormal sound included in the sound recorded in the vehicle with higher precision.

A fifth aspect of the disclosure relates to an abnormal sound identification method of identifying an abnormal sound from a sound recorded in a vehicle using an arithmetic device configured to access a trained model of artificial intelligence, a storage device configured to store corresponding data in which a kind of an abnormal sound is associated with a component of the vehicle, and an output device. The abnormal sound identification method includes identifying, by the arithmetic device, frequency-time data indicating a temporal change in a frequency spectrum of a sound and component operating state data indicating a temporal change of an operating state of the component of the vehicle during recording of the sound, inputting, by the arithmetic device, the frequency-time data to the trained model to cause the trained model to identify an abnormal sound included in the sound as an identified abnormal sound based on the input frequency-time data, and identifying, by the arithmetic device, a corresponding component that is the component associated with the identified abnormal sound in the corresponding data, identifying an operating time zone of the corresponding component based on the component operating state data of the corresponding component, and determining whether to cause the output to output a kind of the identified abnormal sound in determination processing including determining whether a generation time zone of the identified abnormal sound and the operating time zone of the corresponding component overlap as at least one of determination elements.

A sixth aspect of the disclosure relates to a non-transitory storage medium storing instructions that are executable in one or more arithmetic devices configured to access a trained model of artificial intelligence, access a storage device configured to store corresponding data in which a kind of an abnormal sound is associated with a component of a vehicle, and connected to an output device, the instructions causing and that cause the one or more arithmetic devices to perform following functions. The non-transitory storage medium includes identifying frequency-time data indicating a temporal change in a frequency spectrum of a sound recorded in the vehicle and component operating state data indicating a temporal change of an operating state of the component of the vehicle during recording of the sound, inputting the frequency-time data to the trained model to cause the trained model to identify an abnormal sound included in the sound as an identified abnormal sound based on the input frequency-time data, identifying a corresponding component that is the component associated with the identified abnormal sound in the corresponding data, identifying an operating time zone of the corresponding component based on the component operating state data of the corresponding component, and determining whether to cause the output device to output a kind of the identified abnormal sound in determination processing including determining whether a generation time zone of the identified abnormal sound and the operating time zone of the corresponding component overlap as at least one of determination elements.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In an example of a first abnormal sound identification device disclosed in the present specification, in the step of outputting to an output device, an arithmetic device may not output a kind of a first abnormal sound with the kind matching that of a second abnormal sound among the first abnormal sounds, to the output device.

In an example of the first abnormal sound identification device disclosed in the present specification, although a sound pressure level of a sound in a first time range may be higher than a sound pressure level of the sound in a second time range.

Example 1

Figure 1:
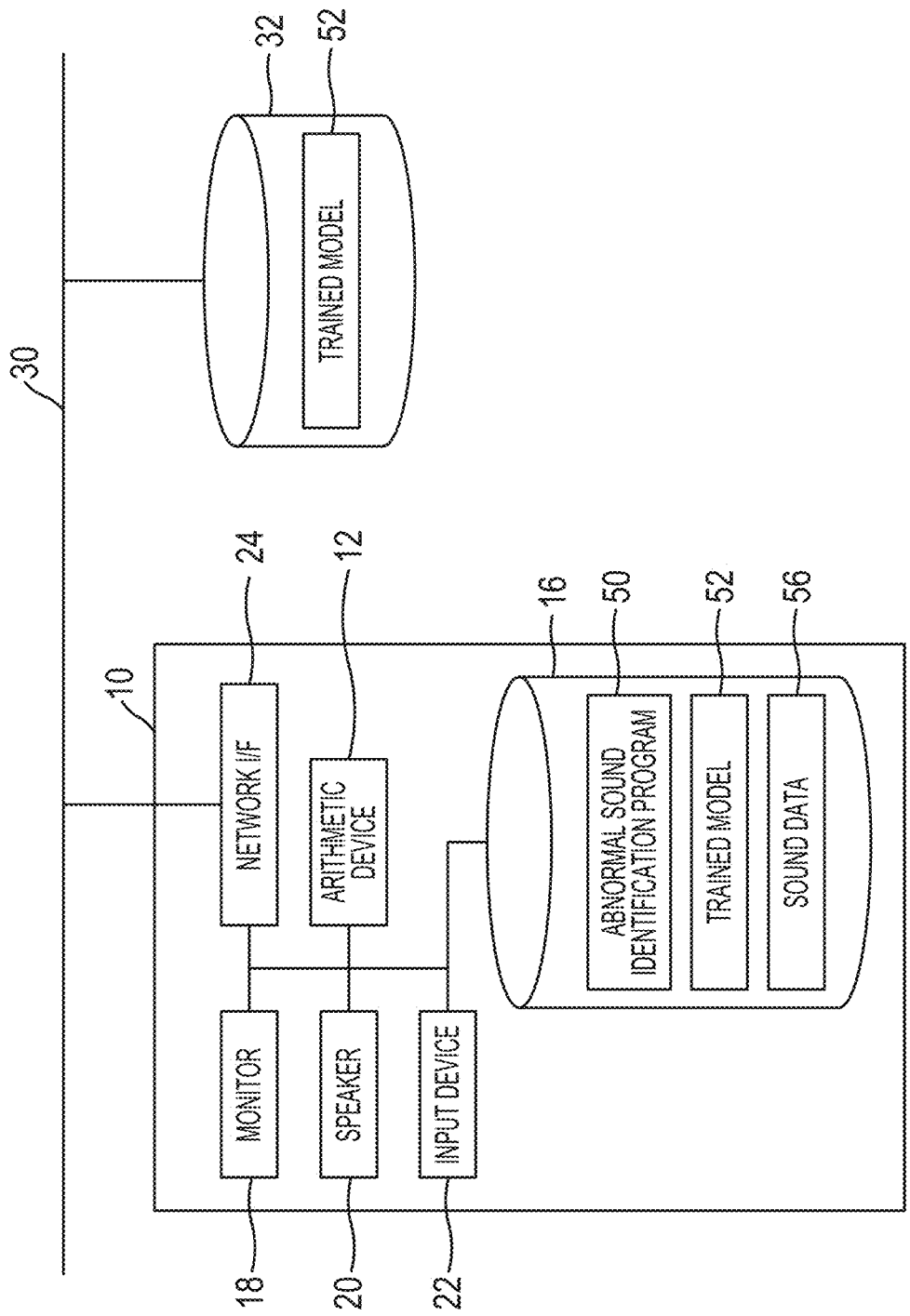
FIG. 1 is a block diagram of an abnormal sound identification device according to Example 1.

The abnormal sound identification device 10 shown in FIG. 1 identifies an abnormal sound from the sound recorded in a vehicle. The abnormal sound identification device 10 is configured by a so-called computer. The abnormal sound identification device 10 includes an arithmetic device 12, a storage device 16, a monitor 18, a speaker 20, an input device 22, a network interface 24, and the like. The arithmetic device 12 is constituted with a central processing unit (CPU), a memory, and the like. The arithmetic device 12 is connected to the storage device 16, the monitor 18, the speaker 20, the input device 22, and the network interface 24. The storage device 16 is constituted with a hard disk drive, a solid state drive, and the like. The storage device 16 stores an abnormal sound identification program 50. The arithmetic device 12 executes the abnormal sound identification program 50. The input device 22 is constituted with a mouse, a keyboard, and the like. When the user operates the input device 22, a signal is input to the arithmetic device 12. The arithmetic device 12 controls the monitor 18 and the speaker 20. Further, the arithmetic device 12 is connected to a network line 30 via the network interface 24. The network line 30 may be the Internet or an intranet. A storage device 32 and the like is connected to the network line 30. At least one of the storage device 16 and the storage device 32 stores a trained model 52. The arithmetic device 12 can access the trained model 52 regardless of whether the trained model 52 is stored in the storage device 16 or the storage device 32. The trained model 52 is artificial intelligence and is constituted with a convolutional neural network (CNN). The trained model 52 is a model in which training is performed to identify an abnormal sound from frequency-time data (data indicating a temporal change of a frequency profile of a sound). In the present example, short-time Fourier transform data (hereinafter referred to as short-time Fourier transform (STFT) data) is used as the frequency-time data. When the STFT data is input to the trained model 52, the trained model 52 identifies the kind of an abnormal sound included in the sound based on STFT data.

The storage device 16 can store sound data 56. The sound data 56 is generated by a recording device 42 shown in FIG.

2. The recording device 42 is mounted on the vehicle 40. The recording device 42 records the sound generated from the vehicle 40 when the vehicle 40 is traveling. The recording device 42 may record inside the vehicle cabin or may record outside the vehicle cabin (for example, in the engine compartment). The recording device 42 stores the recorded sound as the sound data 56 in a portable storage device. The sound data 56 is data showing a waveform of sound vibration (that is, air vibration). The sound data 56 includes vehicle road noise, engine noise, operating sounds of components (for example, a vacuum switching valve (VSV), an alternator, a water pump, and a turbo), and the like. Further, when an abnormal sound is generated in the vehicle 40 for some reason, the abnormal sound is also included in the sound data 56. By connecting the portable storage device to the abnormal sound identification device 10, the sound data 56 can be input to the abnormal sound identification device 10. Further, the sound data 56 can be input to the abnormal sound identification device 10 via the network line 30. As shown in FIG. 1, the sound data 56 input to the abnormal sound identification device 10 is stored in the storage device 16.

Figure 3:
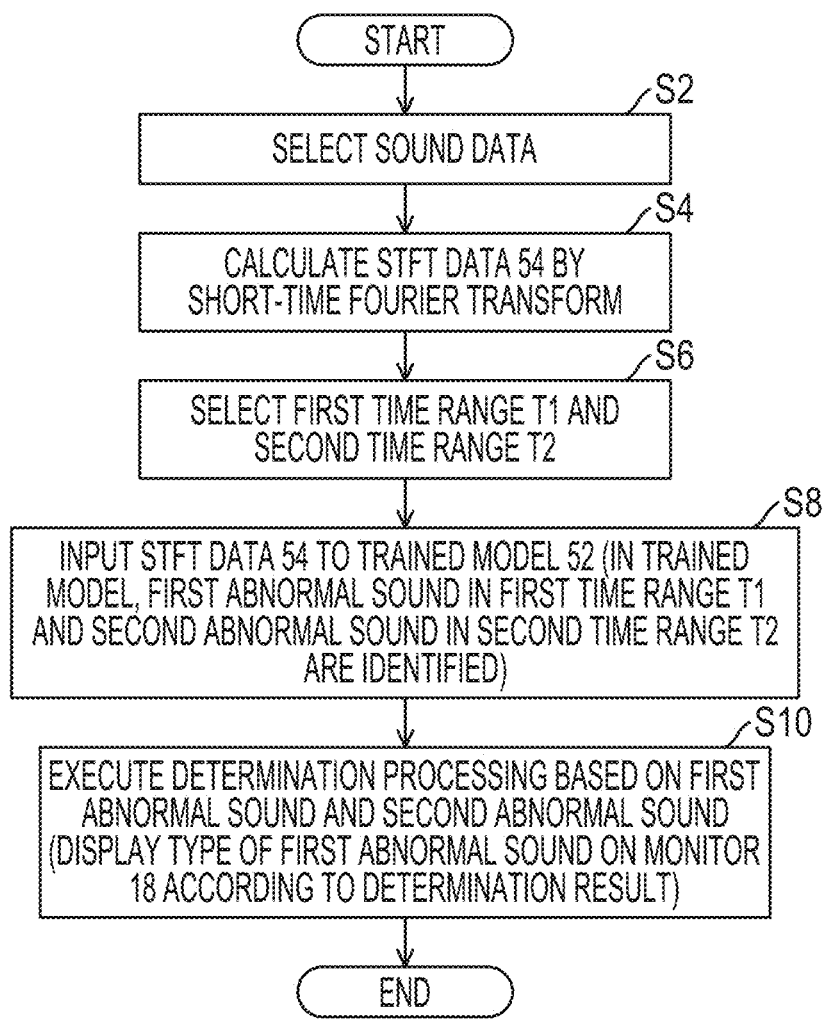
FIG. 3 is a flowchart showing an abnormal sound identification method according to Example 1.

Next, an abnormal sound identification method executed by the abnormal sound identification device 10 will be described. The abnormal sound identification device 10 executes the abnormal sound identification program 50 to execute the abnormal sound identification method shown in FIG. 3. When the user performs a predetermined operation by the input device 22, the arithmetic device 12 starts the abnormal sound identification program 50 (that is, the abnormal sound identification method in FIG. 3).

In step S2, the arithmetic device 12 instructs the user to select the sound data 56 by displaying a window and the like on the monitor 18. The user can select the optional sound data 56 from the sound data 56 stored in the storage device 16 by the input device 22.

Figure 4:
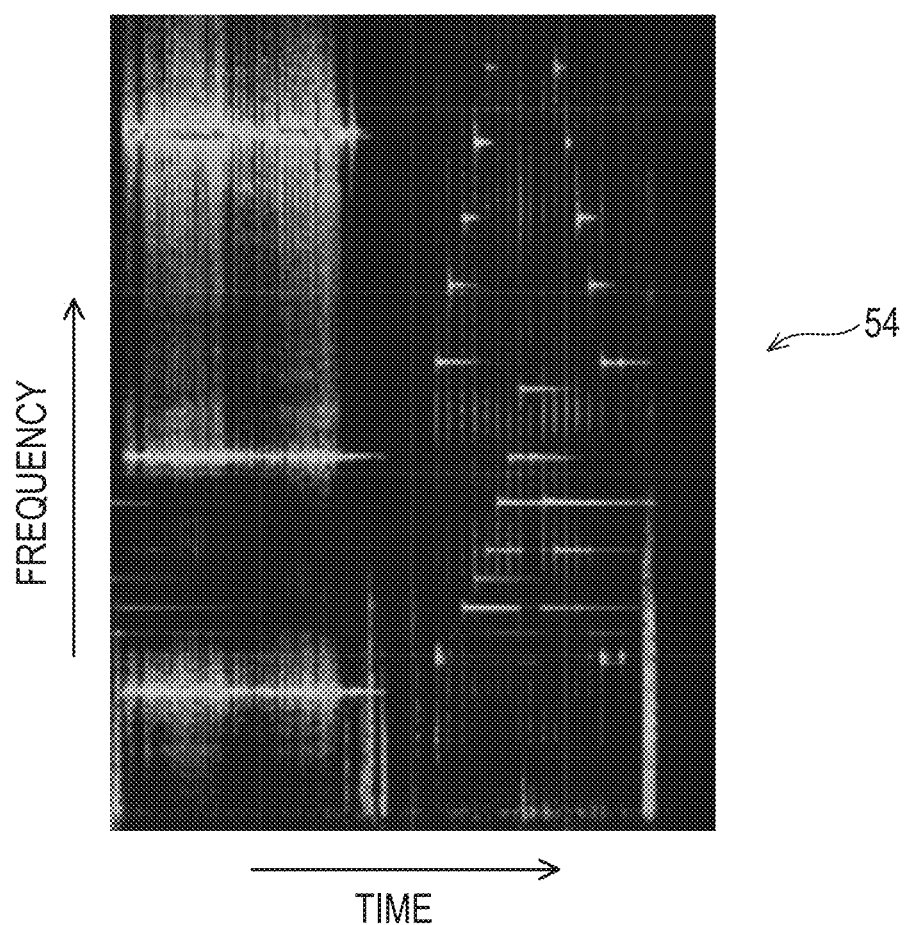
FIG. 4 is a diagram showing STFT data.

In step S4, the arithmetic device 12 performs short-time Fourier transform on the sound data 56 selected in step S2. As a result, the arithmetic device 12 calculates the STFT data 54 shown in FIG. 4. The vertical axis of the STFT data 54 indicates the frequency of sound, and the horizontal axis of the STFT data 54 indicates time. Further, the color of each pixel in the STFT data 54 indicates the sound pressure level (dB). That is, the STFT data 54 is data showing the temporal change of the frequency spectrum of sound. The arithmetic device 12 calculates the STFT data 54 as image data.

Figure 5:
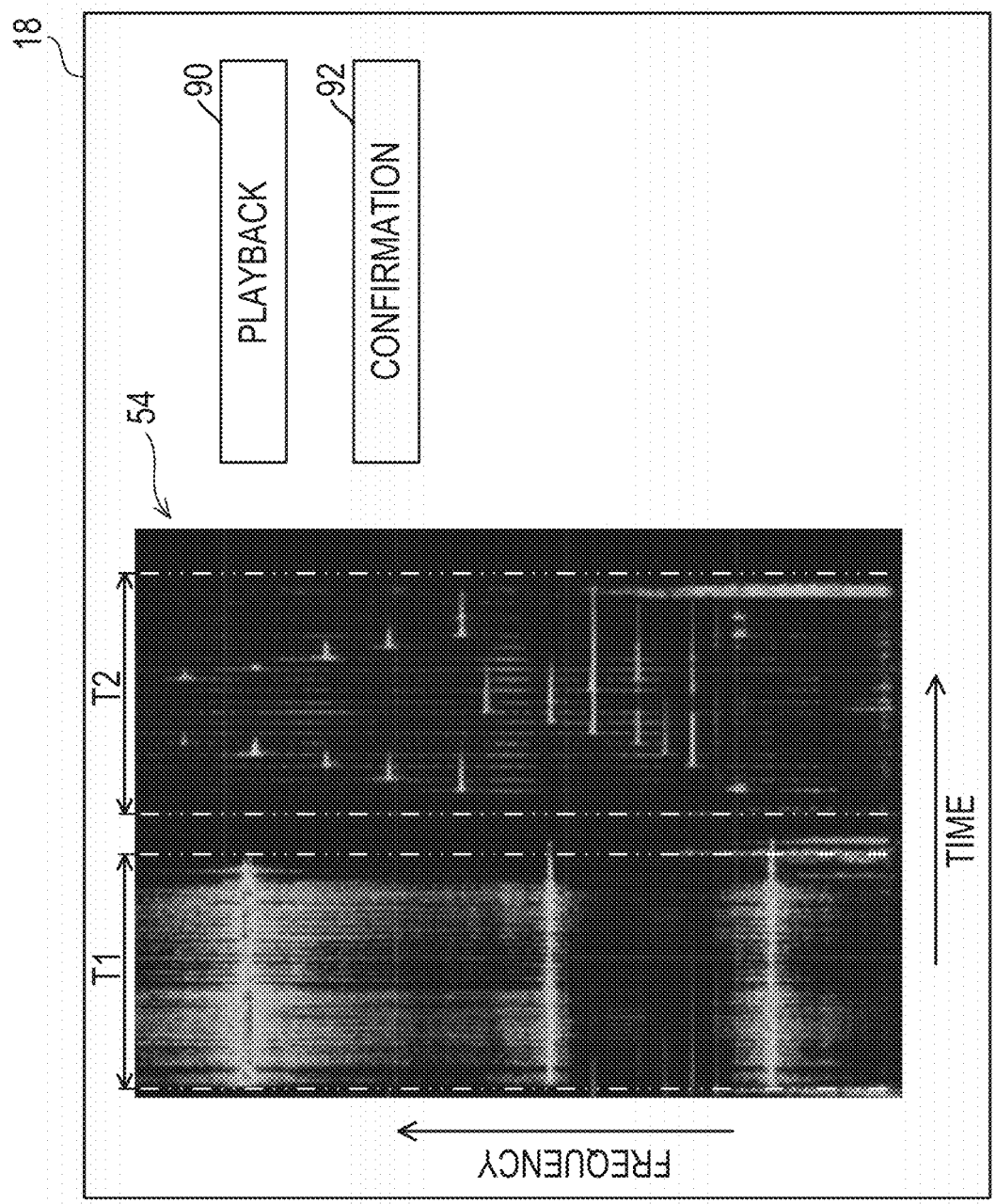
FIG. 5 is a diagram exemplifying a first time range and a second time range.

In step S6, the arithmetic device 12 displays the STFT data 54 on the monitor 18 as shown in FIG. 5, and instructs the user to select a first time range T1 and a second time range T2. The user can select the first time range T1 and the second time range T2 from the time range shown on the horizontal axis of the STFT data 54 by the input device 22. The arithmetic device 12 instructs the user to select the time range in which the abnormal sound is considered to be included as the first time range T1. Further, the arithmetic device 12 instructs the user to select the time range in which the abnormal sound is considered not to be included as the second time range T2. The user can select the first time range T1 and the second time range T2 while visually recognizing the STFT data 54. For example, the user can select a time range in which the sound pressure level (that is, the sound pressure level in all frequency bands) is high as the first time range T1, and select a time range in which the sound pressure level is lower than the first time range T1 as the second time range T2. Further, as shown in FIG. 5, the monitor 18 displays a playback button 90 and a confirmation button 92 next to the STFT data 54. When the playback button 90 is pressed with the time range selected, the arithmetic device 12 reproduces the sound within the selected time range by the speaker 20. Therefore, by listening to the sound within the selected time range, the user can determine whether the abnormal sound is included in the time range. As a result, the user can select the time range in which the abnormal sound is included as the first time range T1 and select the time range in which the abnormal sound is not included as the second time range T2. Further, when the abnormal sound for detection is present, the user can select the time range in which the abnormal sound for detection is present as the first time range T1, and select the time range in which the abnormal sound for detection is not present as the second time range T2. When the user presses the confirmation button 92 with the first time range T1 and the second time range T2 in a state of being selected, the arithmetic device 12 confirms the first time range T1 and the second time range T2 that are selected and moves to the next step.

In step S8, the arithmetic device 12 inputs the STFT data 54 calculated in step S4 into the trained model 52. More specifically, the arithmetic device 12 first inputs an STFT data 54-1 in the first time range T1 into the trained model 52, and then inputs an STFT data 54-2 in the second time range T2 into the trained model 52.

When the STFT data 54-1 in the first time range T1 is input to the trained model 52, the trained model 52 extracts features from the input STFT data 54-1 and identifies an abnormal sound included in the STFT data 54-1 (more specifically, the abnormal sound included in the sound represented by the STFT data 54-1) based on the extracted features. That is, the trained model 52 identifies a first abnormal sound generated within the first time range T1. The trained model 52 identifies the kind of the first abnormal sound at the same time as identifying the first abnormal sound. The trained model 52 identifies an abnormal sound A, an abnormal sound B, and the like as the kinds of abnormal sounds. In a more specific example, the trained model 52 identifies a VSV abnormal sound, an alternator abnormal sound, a water pump abnormal sound, a turbo abnormal sound, and the like as abnormal sounds. That is, the kind of the abnormal sound represents the generation source of the abnormal sound. In step S8, a plurality of first abnormal sounds may be identified.

When the STFT data 54-2 in the second time range T2 is input to the trained model 52, the trained model 52 extracts features from the input STFT data 54-2 and identifies an abnormal sound included in the STFT data 54-2 (more specifically, the abnormal sound included in the sound represented by the STFT data 54-2) based on the extracted features. That is, the trained model 52 identifies a second abnormal sound generated within the second time range T2. The trained model 52 identifies the kind of the second abnormal sound at the same time as identifying the second abnormal sound. In step S8, a plurality of second abnormal sounds may be identified.

As described above, in step S8, the first abnormal sound and the second abnormal sound are identified.

Figure 6:
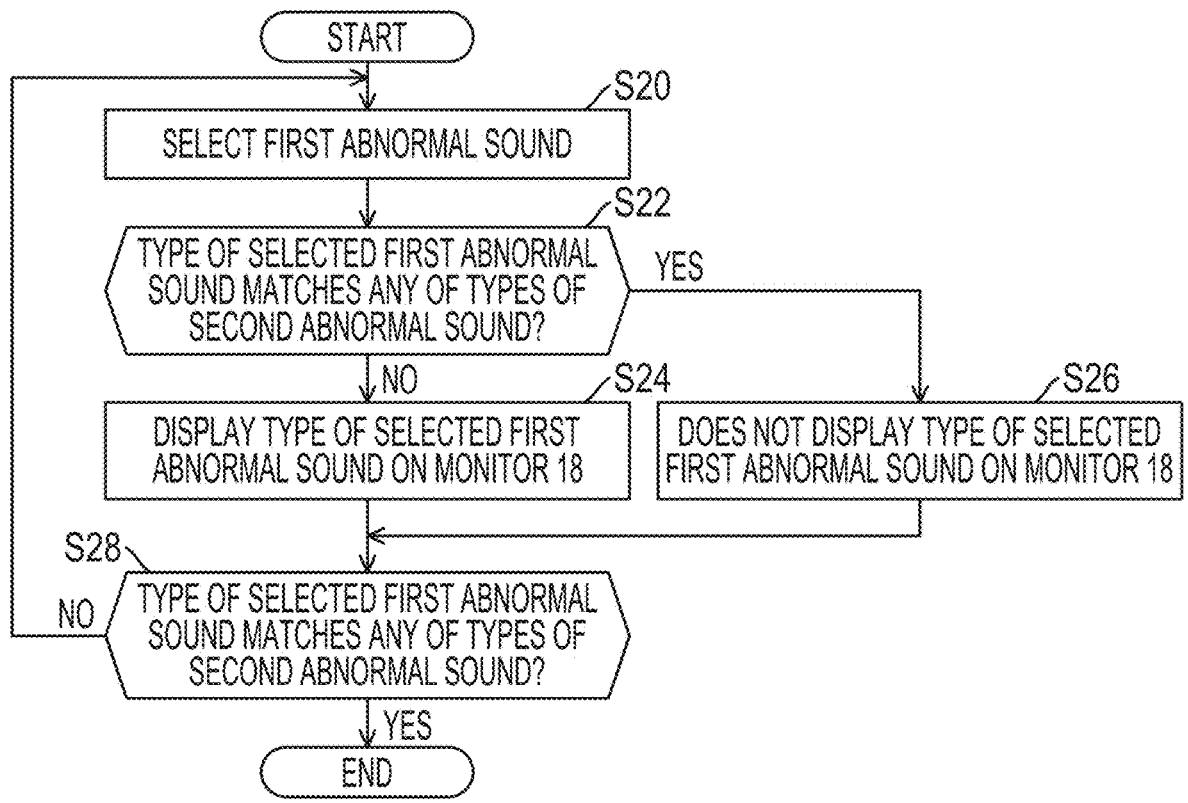
FIG. 6 is a flowchart showing determination processing based on a first abnormal sound and a second abnormal sound.

In step S10, the arithmetic device 12 executes the determination processing based on the first abnormal sound and the second abnormal sound, and displays the kind of the first abnormal sound on the monitor 18 according to the determination result. FIG. 6 shows the details of step S10. As shown in FIG. 6, in step S10, the arithmetic device 12 executes steps S20 to S28.

In step S20, the arithmetic device 12 selects one first abnormal sound from the first abnormal sounds identified in step S8. When there is one abnormal sound identified in step S8, the first abnormal sound is selected.

In step S22, the arithmetic device 12 determines whether the kind of the first abnormal sound selected in step S20 matches any of the kinds of the second abnormal sound identified in step S8. For example, when the first abnormal sound selected in step S20 is the abnormal sound A and the second abnormal sound identified in step S8 is the abnormal sound A and the abnormal sound B, the arithmetic device 12 determines YES in step S22. Further, for example, when the first abnormal sound selected in step S20 is an abnormal sound C and the second abnormal sound identified in step S8 is the abnormal sound A and the abnormal sound B, the arithmetic device 12 determines NO in step S22.

Figure 7:
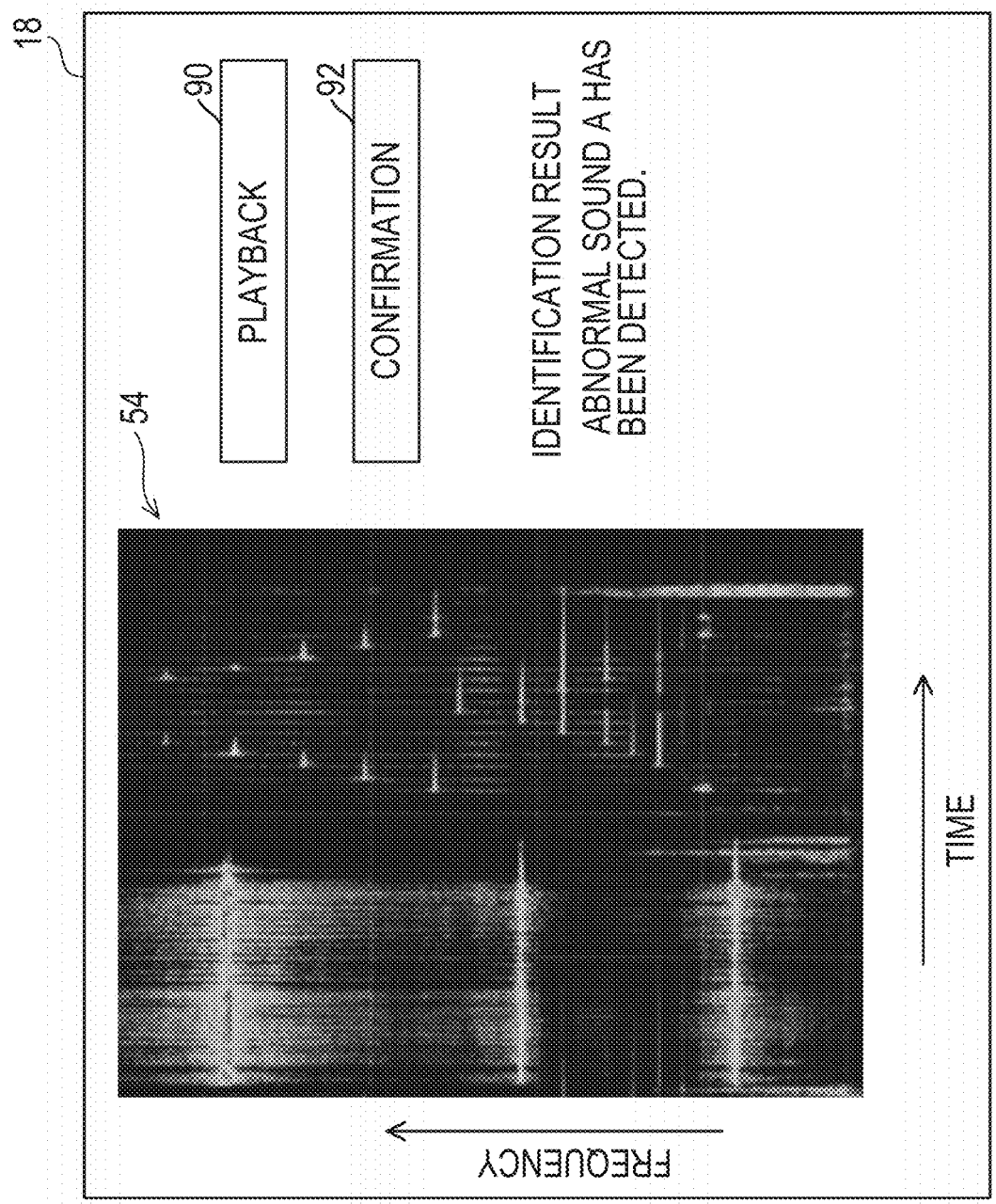
FIG. 7 is a diagram showing a display screen of an identification result of an abnormal sound.

When NO is determined in step S22, the arithmetic device 12 executes step S24. In step S24, the arithmetic device 12 displays the kind of the first abnormal sound selected in step S20 on the monitor 18. For example, when the first abnormal sound selected in step S20 is the abnormal sound A, in step S24, "the abnormal sound A has been detected" is displayed on the monitor 18 as shown in FIG. 7. On the other hand, when YES is determined in step S22, the arithmetic device 12 executes step S26. In step S26, the arithmetic device 12 does not display the kind of the first abnormal sound selected in step S20 on the monitor 18.

In step S28, the arithmetic device 12 determines whether the processing for all the first abnormal sounds identified in step S8 is completed. When NO is determined in step S28, step S20 is executed again. In this case, in the next step S20, the first abnormal sound in which the processing is not completed is selected. Therefore, steps S20 to S28 are repeated until the processing for all the first abnormal sounds is completed. Therefore, when a plurality of first abnormal sounds is identified by the trained model 52, solely the first abnormal sound determined to be NO in step S22 is displayed on the monitor 18 among the first abnormal sounds. When the first abnormal sounds determined to be NO is present in step S22, the first abnormal sounds are displayed as a list on the monitor 18 in step S24. Further, when the first abnormal sound determined to be NO in step S22 is not present, "Could not detect the abnormal sound." is displayed on the monitor 18. When the processing for all the first abnormal sounds identified by the trained model 52 is completed, the arithmetic device 12 ends the abnormal sound determination processing.

As described above, when the kind of the first abnormal sound being selected does not match the kind of the second abnormal sound, the arithmetic device 12 displays the kind of the first abnormal sound being selected on the monitor 18, and does not display the kind of the first abnormal sound being selected on the monitor 18 when the kind of the first abnormal sound being selected matches the kind of the second abnormal sound. As a result, solely the abnormal sound recognized by the user as the abnormal sound can be displayed on the monitor 18. That is, as described above, the first time range T1 is a time range in which the user determines that an abnormal sound is generated. Therefore, the first abnormal sound identified by the trained model 52 within the first time range T1 includes the abnormal sound recognized by the user. On the other hand, the first abnormal sound identified by the trained model 52 within the first time range T1 may include an abnormal sound not recognized by the user. Further, as described above, the second time range T2 is a time range in which the user determines that no abnormal sound is generated. Therefore, the second abnormal sound identified by the trained model 52 within the second time range T2 is an abnormal sound that is not recognized by the user. Therefore, among the first abnormal sounds, the first abnormal sound with a kind matching that of the second abnormal sound is considered to be an abnormal sound that is not recognized by the user. Therefore, the arithmetic device 12 displays the first abnormal sound with a kind not matching that of the second abnormal sound among the first abnormal sounds on the monitor 18, and does not display the first abnormal sound with a kind matching that of the second abnormal sound among the first abnormal sounds on the monitor 18. As a result, among the abnormal sounds identified by the trained model 52 in the first time range T1, solely the abnormal sounds recognized by the user are displayed on the monitor 18. Therefore, with the abnormal sound identification device 10, the abnormal sound recognized by the user as an abnormal sound can be accurately identified.

As described above, with the abnormal sound identification device 10 of Example 1, solely the abnormal sound recognized by the user as an abnormal sound can be selected from the abnormal sounds identified by the trained model 52, and the kind of the abnormal sound can be displayed on the monitor 18. That is, solely the abnormal sound that the user actually cares about can be identified with high precision.

Although the first time range T1 and the second time range T2 are specified by the user in Example 1, the first time range T1 and the second time range T2 may be automatically specified by the arithmetic device 12. For example, the arithmetic device 12 may specify the time range in which the sound pressure level is high as the first time range T1, and specify the time range in which the sound pressure level is low as the second time range T2. Although the first time range T1 and the second time range T2 are automatically specified in this way, it is highly possible that the second abnormal sound identified in the second time range T2 having a low sound pressure level is an abnormal sound that can not be recognized by the user. Therefore, by displaying solely the first abnormal sound with a kind not matching that of the second abnormal sound among the first abnormal sounds on the monitor 18, solely the abnormal sounds that can be recognized by the user can be displayed on the monitor 18.

Figure 8:
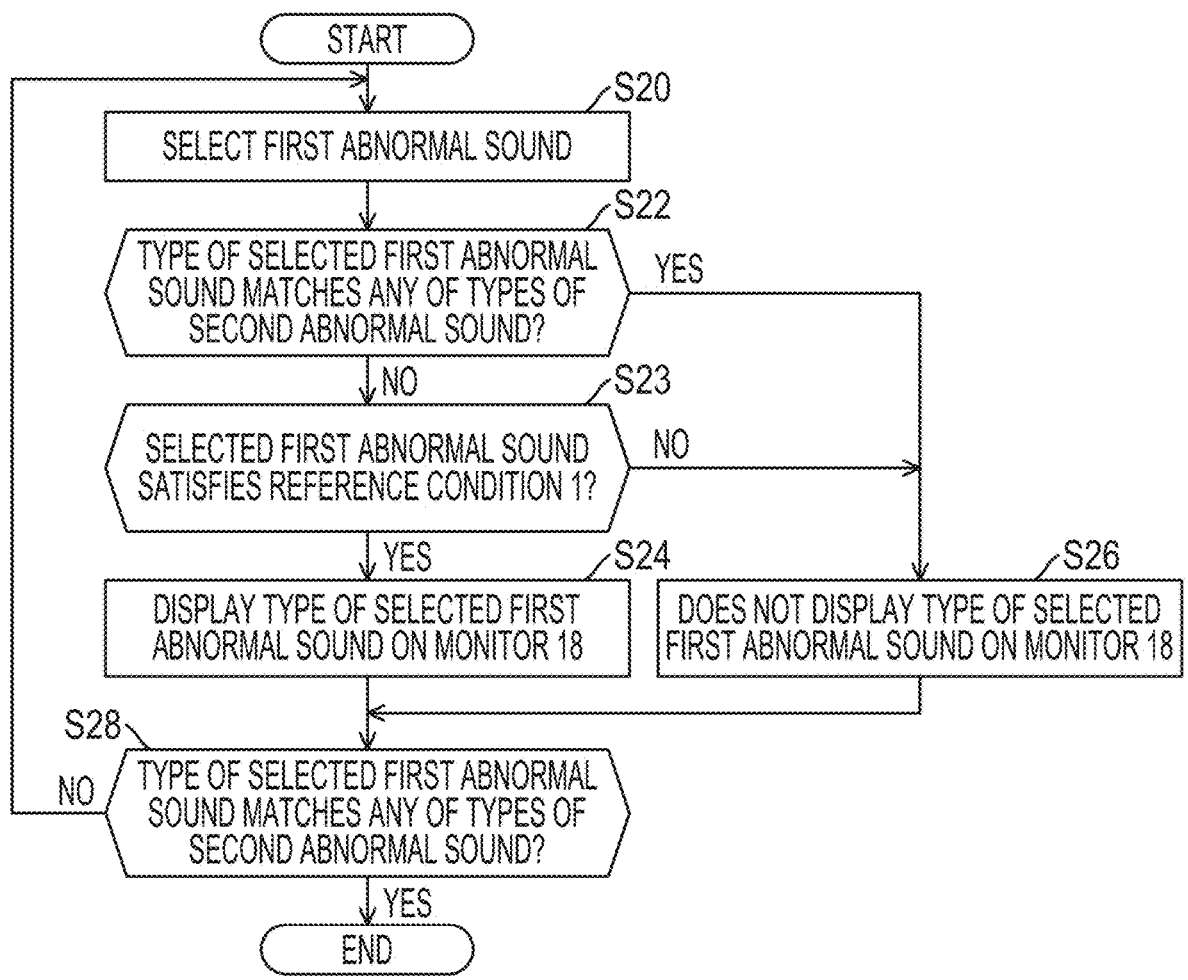
FIG. 8 is a flowchart showing determination processing of a modification example of Example 1.

In FIG. 6, when NO is determined in step S22, the selected first abnormal sound is displayed on the monitor 18 in step S24. However, as shown in FIG. 8, step S23 that makes another determination between steps S22 and S24 may be present. In FIG. 8, although NO is determined in step S22, when the selected first abnormal sound does not satisfy a reference condition 1 (that is, in a case of NO in step S23), the selected first abnormal sound is not displayed on the monitor 18. As described above, although NO is determined in step S22, the selected first abnormal sound may not be displayed on the monitor 18.

Figure 9:
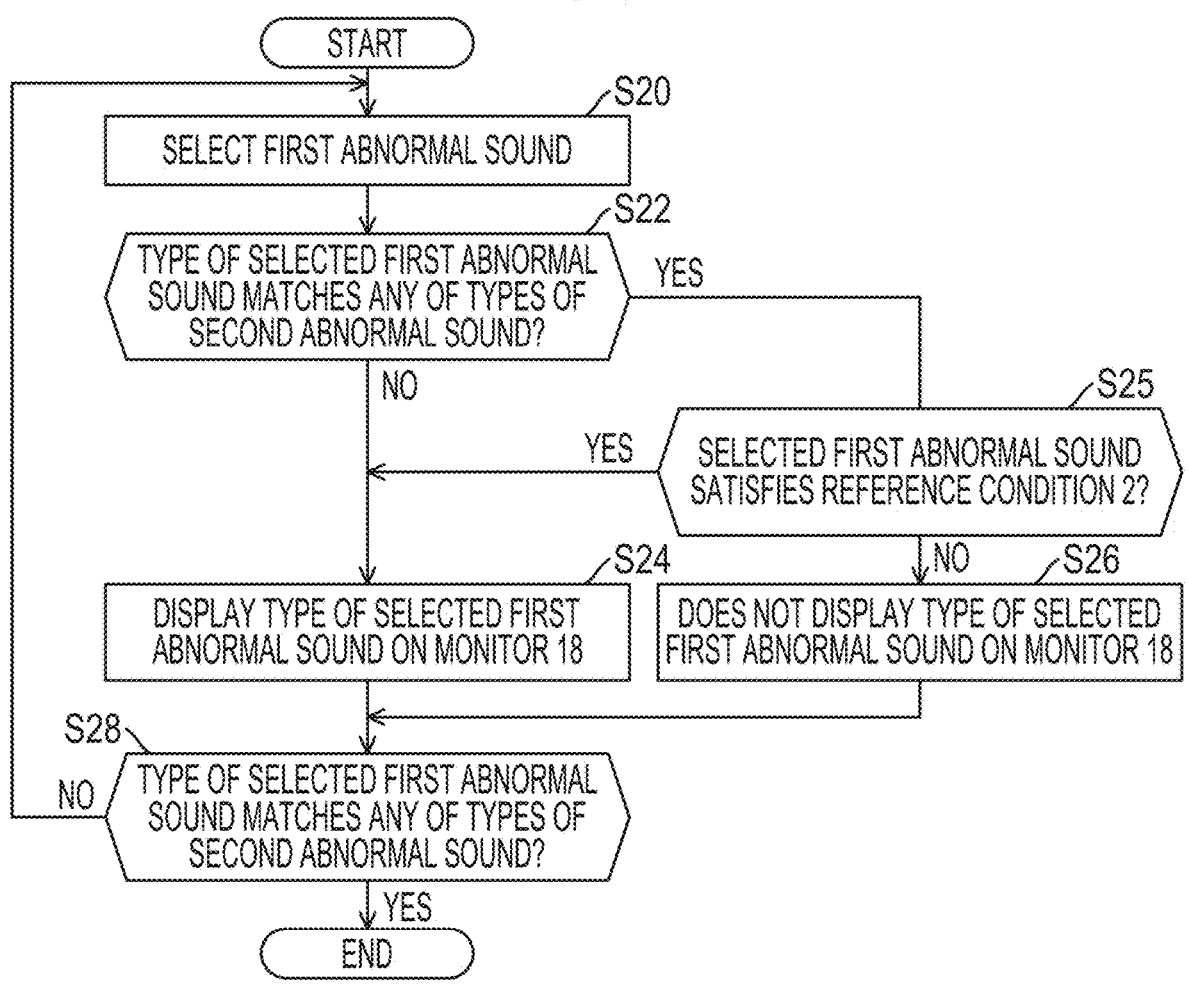
FIG. 9 is a flowchart showing determination processing of the modification example of Example 1.

Further, in FIG. 6, when YES is determined in step S22, the selected first abnormal sound is not displayed on the monitor 18 in step S26. However, as shown in FIG. 9, step S25 that makes another determination between steps S22 and S26 may be present. In FIG. 9, although YES is determined in step S22, when the selected first abnormal sound satisfies a reference condition 2 (that is, in a case of YES in step S25), the selected first abnormal sound is displayed on the monitor 18. As described above, although YES is determined in step S22, the selected first abnormal sound may be displayed on the monitor 18. Further, FIGS. 8 and 9 may be combined.

Example 2

Figure 10:
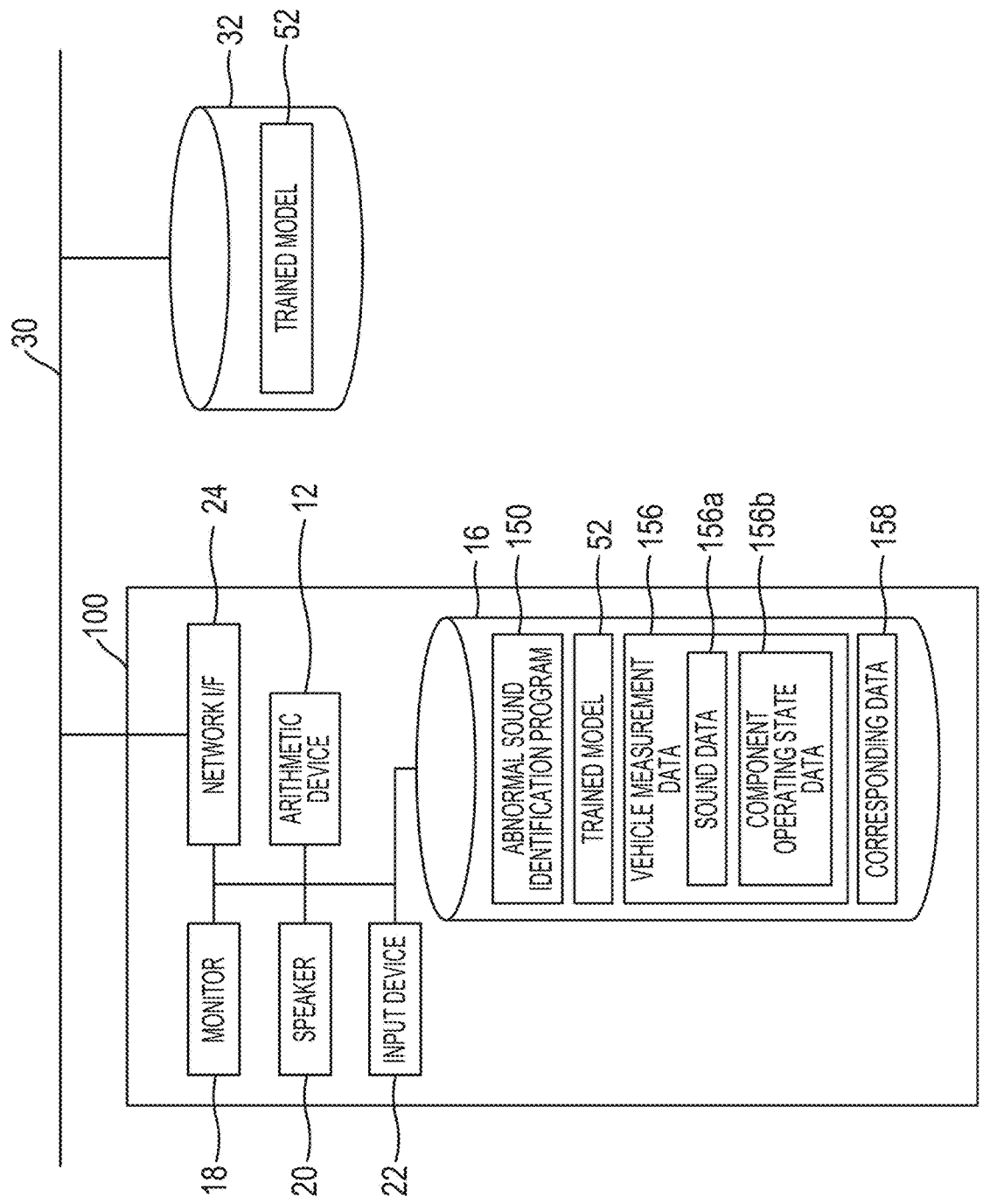
FIG. 10 is a block diagram of an abnormal sound identification device according to Example 2.

An abnormal sound identification device 100 of Example 2 shown in FIG. 10 identifies an abnormal sound from the sound recorded in a vehicle. The abnormal sound identification device 100 of Example 2 has the same configuration as the abnormal sound identification device 10 of Example 1 as hardware. In Example 2, an abnormal sound identification program 150 is stored in the storage device 16. The abnormal sound identification program 150 of Example 2 is different from the abnormal sound identification program 50 of Example 1. Further, in Example 2, the storage device 16 stores corresponding data 158. Further, in Example 2, a vehicle measurement data 156 that is a set of sound data 156a and component operating state data 156b, is input to the storage device 16. Other configurations of the abnormal sound identification device 100 of Example 2 are the same as the configuration of the abnormal sound identification device 10 of Example 1.

Figure 2:
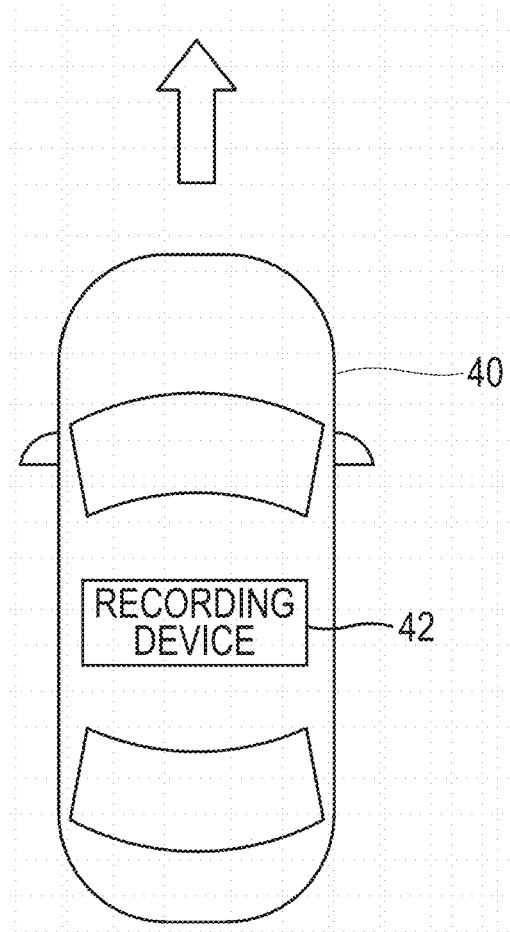
FIG. 2 is an explanatory diagram of a recording device.

The sound data 156a of Example 2 is the sound data recorded in the vehicle 40 by the recording device 42 shown in FIG. 2, similarly to the sound data 56 of Example 1. Further, in Example 2, the operating state of each component of the vehicle 40 is measured at the same time as the sound data 156a is recorded. For example, the operating state of a VSV, an alternator, a water pump, a turbo, and the like is measured. The data indicating the operating state of the component measured in the vehicle 40 is the component operating state data 156b. Each component operating state data 156b is measured in synchronization with the sound data 156a. That is, the vehicle measurement data 156 is data constituted with a set of the sound data 156a and a plurality of the component operating state data 156b. The vehicle measurement data 156 is input to the abnormal sound identification device 100. The vehicle measurement data 156 input to the abnormal sound identification device 100 is stored in the storage device 16.

Figures 11, 12:
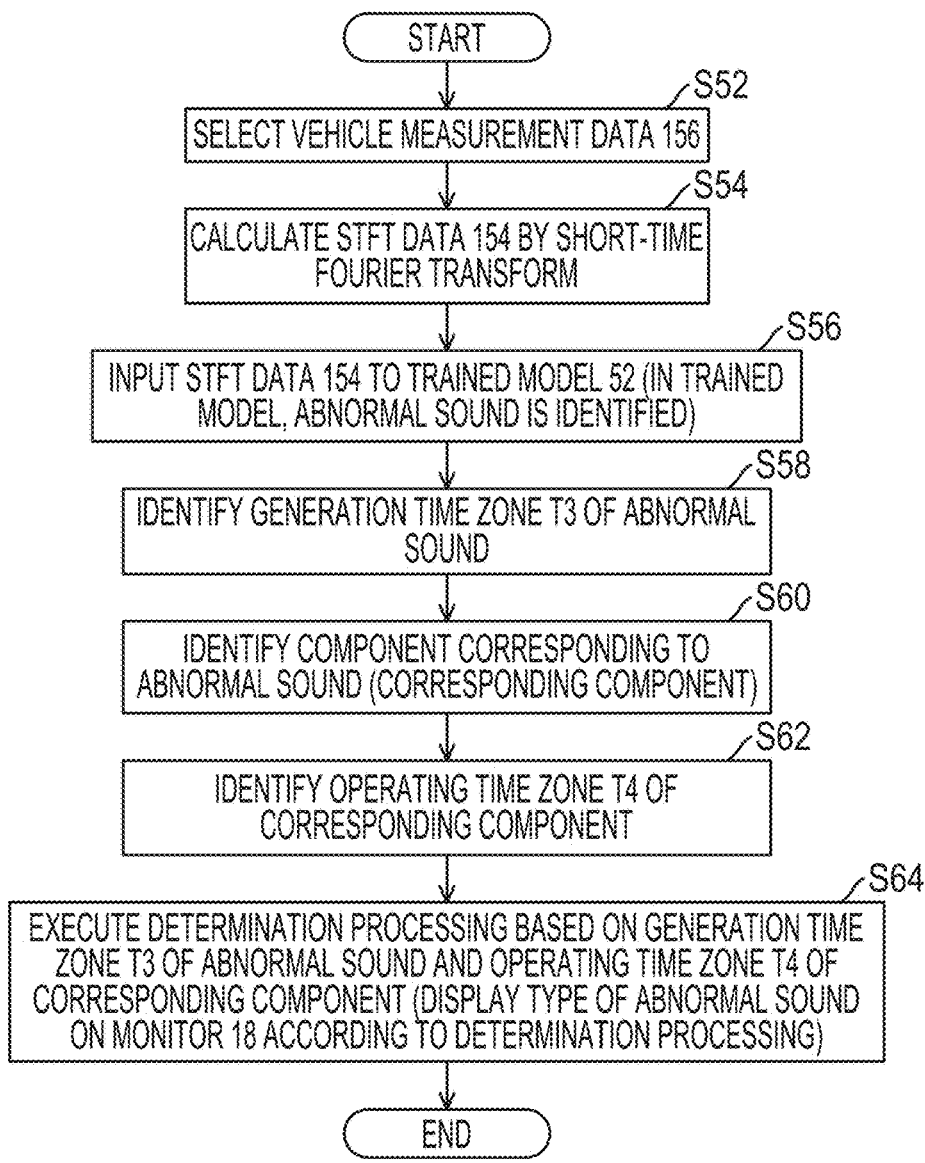
FIG. 11 is a diagram showing corresponding data.
FIG. 12 is a flowchart showing an abnormal sound identification method according to Example 2.

The corresponding data 158 is data in which the kind of the abnormal sound generated in the vehicle 40 and the component that is the generation source of the abnormal sound are associated with each other. For example, in the corresponding data 158, as shown in FIG. 11, the VSV is associated as the generation source of the abnormal sound A, the alternator is associated as the generation source of the abnormal sound B, the water pump is associated as the generation source of the abnormal sound C, and the turbo is associated as the generation source of an abnormal sound D.

Next, an abnormal sound identification method executed by the abnormal sound identification device 100 will be described. The abnormal sound identification device 100 executes the abnormal sound identification program 150 to execute the abnormal sound identification method shown in FIG. 12. When the user performs a predetermined operation by the input device 22, the arithmetic device 12 starts the abnormal sound identification program 150 (that is, the abnormal sound identification method in FIG. 12).

In step S52, the arithmetic device 12 instructs the user to select the vehicle measurement data 156 by displaying a window and the like on the monitor 18. The user can select the optional vehicle measurement data 156 from the vehicle measurement data 156 stored in the storage device 16 by the input device 22.

In step S54, the arithmetic device 12 performs short-time Fourier transform on the sound data 156a included in the vehicle measurement data 156 selected in step S52. As a result, the arithmetic device 12 calculates STFT data 154 shown in FIG. 14. The vertical axis of the STFT data 154 indicates the frequency of sound, and the horizontal axis of the STFT data 54 indicates time. Further, the color of each pixel in the STFT data 154 indicates the sound pressure level (dB). That is, the STFT data 154 is data showing the temporal change of the frequency spectrum of sound. The arithmetic device 12 calculates the STFT data 154 as image data.

Figure 14:
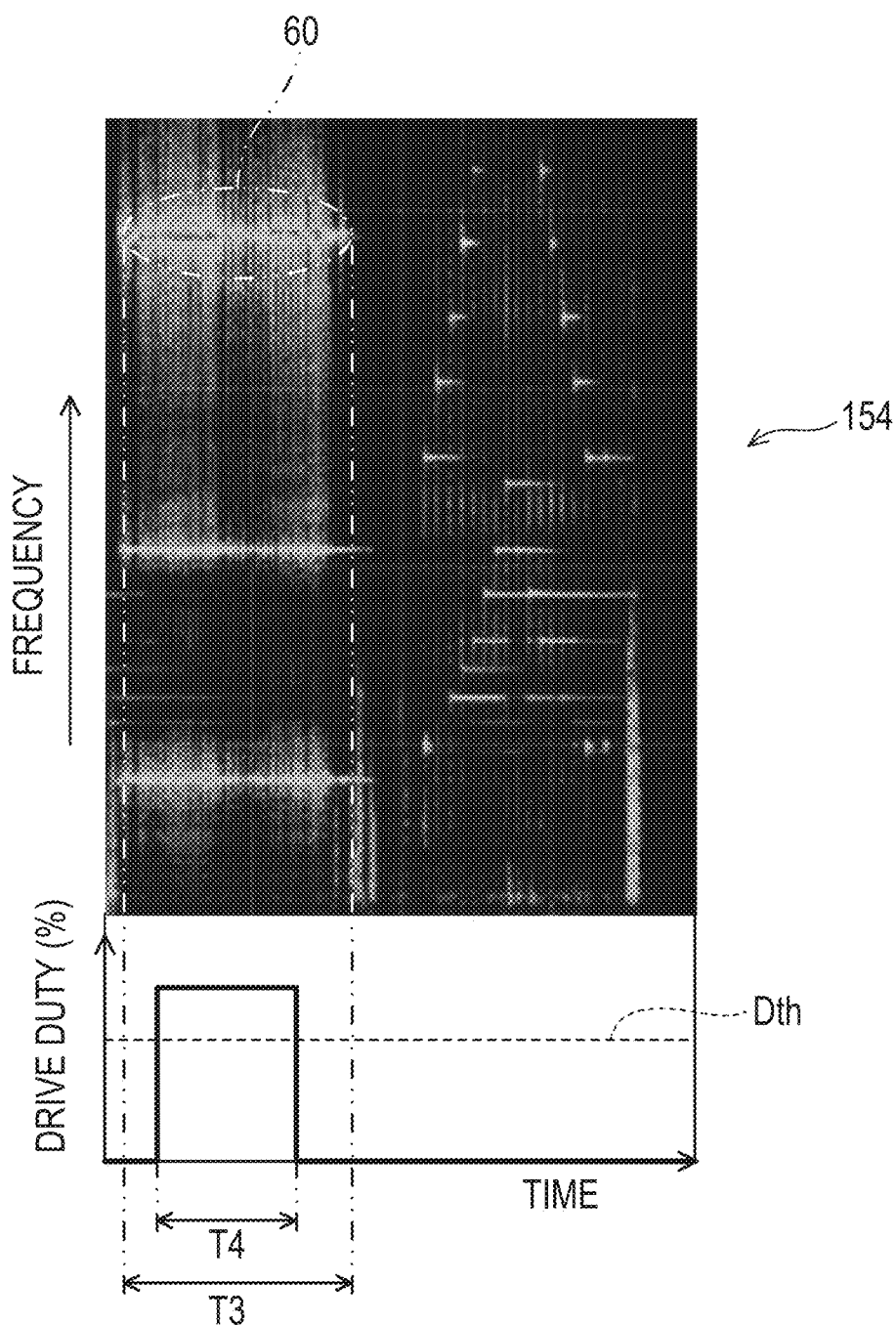
FIG. 14 is a diagram exemplifying STFT data and component operating state data.

Further, FIG. 14 shows component operating state data 156bv of the VSV as an example of the component operating state data 156b. The horizontal axis of the component operating state data 156bv indicates time, and is synchronized with the horizontal axis of the STFT data 154. The vertical axis of the component operating state data 156bv indicates the drive duty (%) of the VSV. The period when the drive duty is high is the period when the VSV is operating, and the period when the drive duty is low is the period when the VSV is stopped. As described above, the arithmetic device 12 converts the sound data 156a into the STFT data 154, so that the data in which the STFT data 154 and the component operating state data 156b are synchronized can be obtained.

In step S56, the arithmetic device 12 inputs the STFT data 154 calculated in step S54 into the trained model 52. Then, the trained model 52 extracts features from the input STFT data 154 and identifies an abnormal sound included in the STFT data 154 (more specifically, the abnormal sound included in the sound represented by the STFT data 154) based on the extracted features. The trained model 52 identifies the kind of the abnormal sound at the same time as identifying the abnormal sound. The trained model 52 identifies the abnormal sound A, the abnormal sound B, the abnormal sound C, the abnormal sound D, and the like as the kinds of abnormal sounds. In a more specific example, the trained model 52 identifies a VSV abnormal sound, an alternator abnormal sound, a water pump abnormal sound, a turbo abnormal sound, and the like as abnormal sounds. In step S56, the trained model 52 may identify kinds of a plurality of abnormal sounds.

In step S58, the arithmetic device 12 identifies a generation time zone T3 of an abnormal sound. For example, when the trained model 52 has a function called gradient-weighted class activation mapping (Grad-CAM), the trained model 52 outputs a basis range that is constituted with a frequency range and a time range that are the identification basis for the abnormal sound in step S56. In this case, the arithmetic device 12 can identify the generation time zone of the abnormal sound from the basis range output by the trained model 52. For example, when the trained model 52 outputs a basis range 60 as shown in FIG. 14, the arithmetic device 12 can identify the time range that is an example of the basis range 60, as the generation time zone T3 of the abnormal sound. Further, the arithmetic device 12 may identify the generation time zone of the abnormal sound by another method. For example, a time zone in which the sound pressure level is high may be identified as the generation time zone of an abnormal sound. When a plurality of abnormal sounds is identified in step S56, the arithmetic device 12 identifies the generation time zone T3 for each abnormal sound in step S58.

In step S60, the arithmetic device 12 reads out the corresponding data 158 from the storage device 16. The arithmetic device 12 identifies the component that is the generation source of the abnormal sound identified in step S56 based on the corresponding data 158. For example, when the abnormal sound A is identified in step S56, the arithmetic device 12 identifies the VSV as the generation source of the abnormal sound A based on the corresponding data 158 (that is, FIG. 11). In the following, the component identified in step S60 (that is, the component corresponding to the abnormal sound identified in step S56) is referred to as a corresponding component. Further, when a plurality of abnormal sounds is identified in step S56, the arithmetic device 12 identifies a corresponding component for each abnormal sound in step S60.

In step S62, the arithmetic device 12 identifies an operating time zone T4 of the corresponding component that is the generation source of the abnormal sound. The arithmetic device 12 reads out the component operating state data 156b of the corresponding component identified in step S60. Then, the operating time zone of the corresponding component is identified from the component operating state data 156b. For example, when the corresponding component is the VSV, the arithmetic device 12 reads out the component operating state data 156bv of the VSV shown in FIG. 14. The arithmetic device 12 sets a predetermined threshold value Dth for the drive duty of the VSV, and identifies a period in which the drive duty is higher than the threshold value Dth as the operating time zone T4 of the VSV. As described above, when the component operating state data 156b of the corresponding component is indicated by a numerical value, such as a drive duty, the arithmetic device 12 calculates the operating time zone T4 by setting a threshold value. Further, when the component operating state data 156b of the corresponding component is indicated by the binary value of ON-OFF, the arithmetic device 12 can identify the period of ON as the operating time zone T4. As described above, in step S62, the arithmetic device 12 reads out the component operating state data 156b of the corresponding component, and identifies the operating time zone T4 of the corresponding component from the read component operating state data 156b. When a plurality of corresponding components is present, the arithmetic device 12 identifies the operating time zone T4 for each corresponding component.

Figure 13:
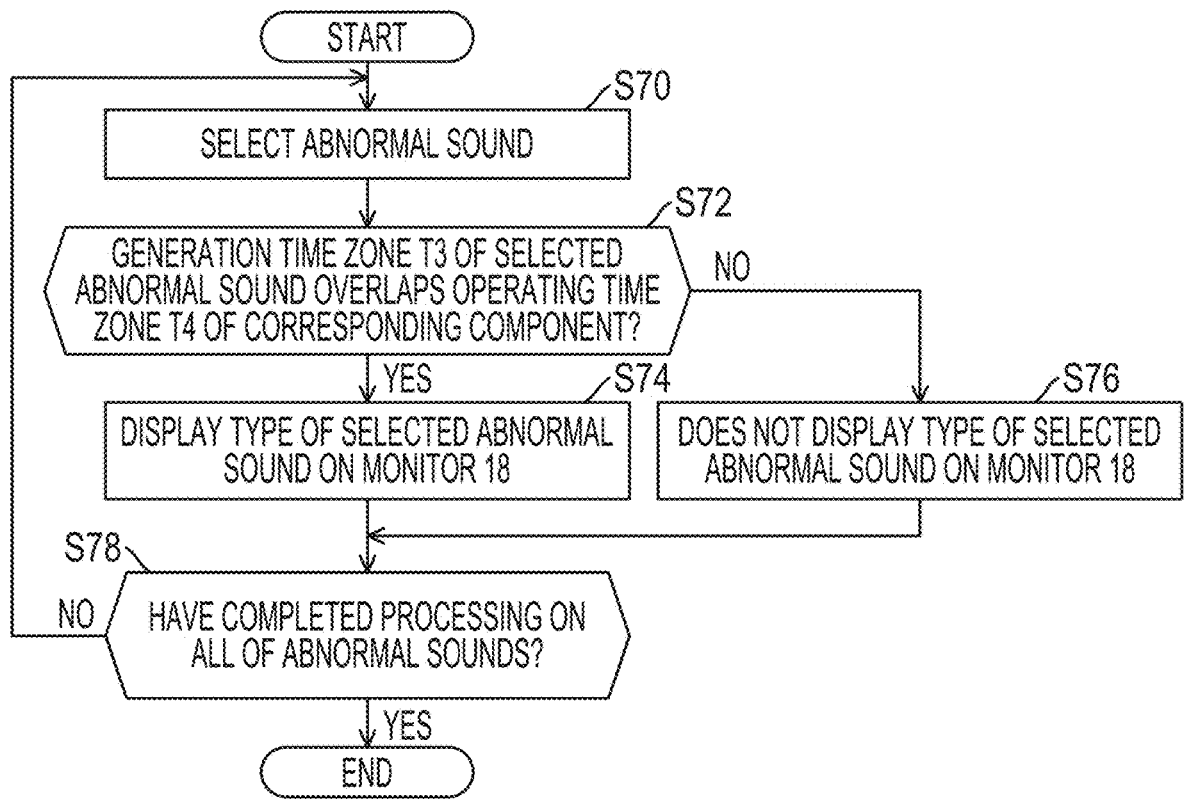
FIG. 13 is a flowchart showing determination processing based on a generation time zone of an abnormal sound and an operating time zone of a corresponding component.

In step S64, the arithmetic device 12 executes determination processing based on the generation time zone T3 of the abnormal sound and the operating time zone T4 of the corresponding component, and displays the kind of the abnormal sound on the monitor 18 according to the determination result. FIG. 13 shows the details of step S64. As shown in FIG. 13, in step S64, the arithmetic device 12 executes steps S70 to S78.

In step S70, the arithmetic device 12 selects one abnormal sound from the abnormal sounds identified in step S56. When there is one abnormal sound identified in step S56, the abnormal sound is selected.

Figure 15:
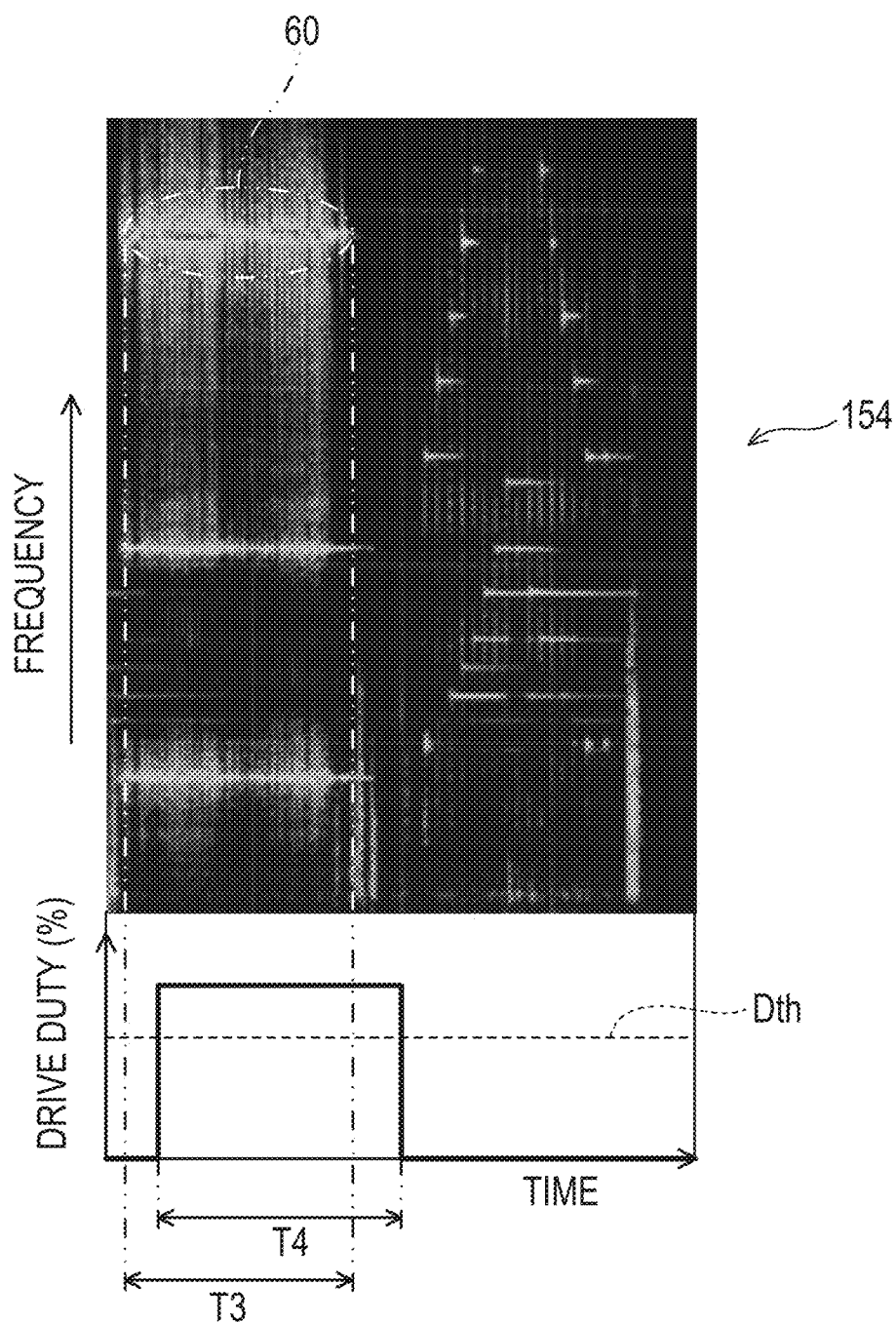
FIG. 15 is a diagram exemplifying the STFT data and the component operating state data.
Figure 16:
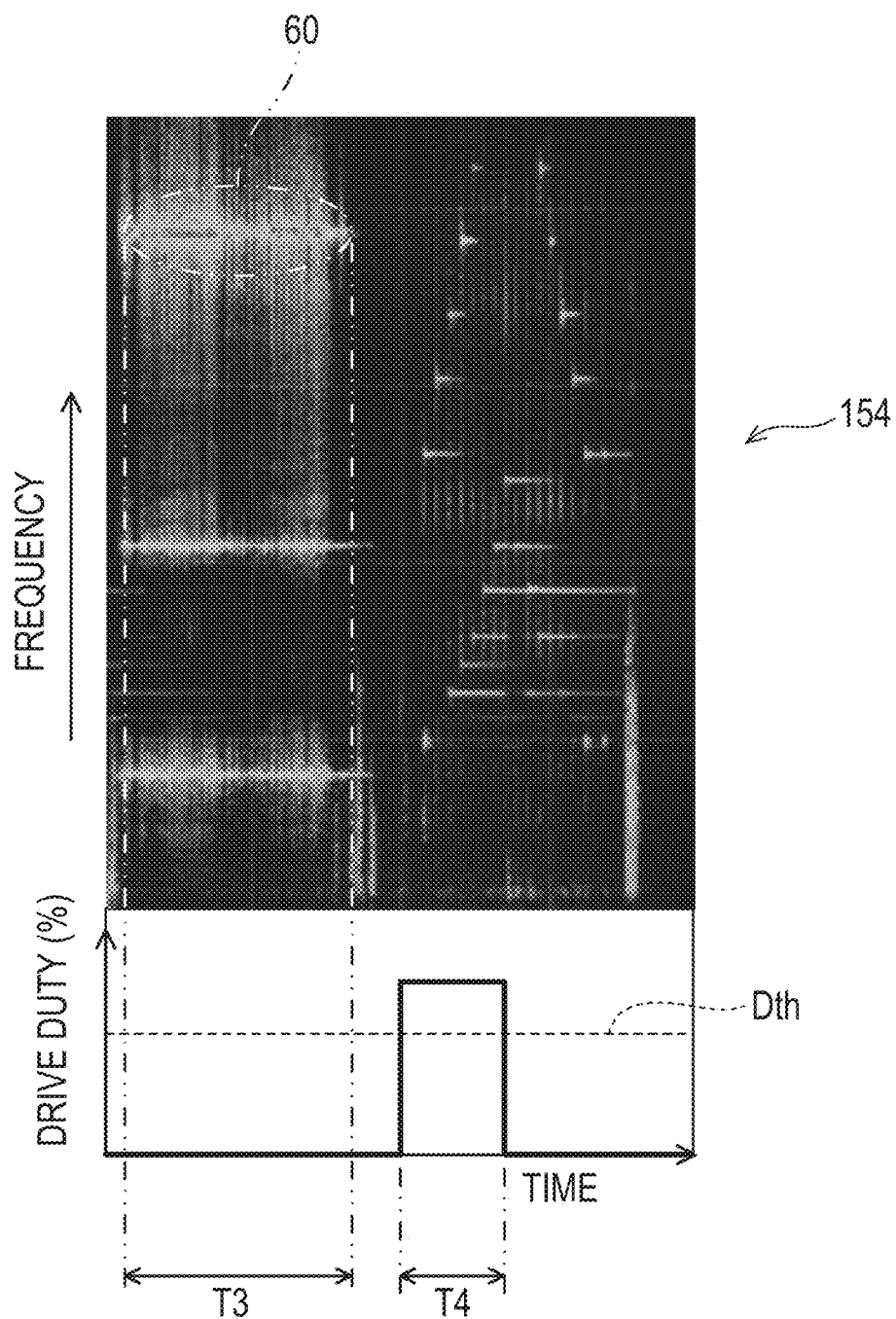
FIG. 16 is a diagram exemplifying the STFT data and the component operating state data.
Figure 17:
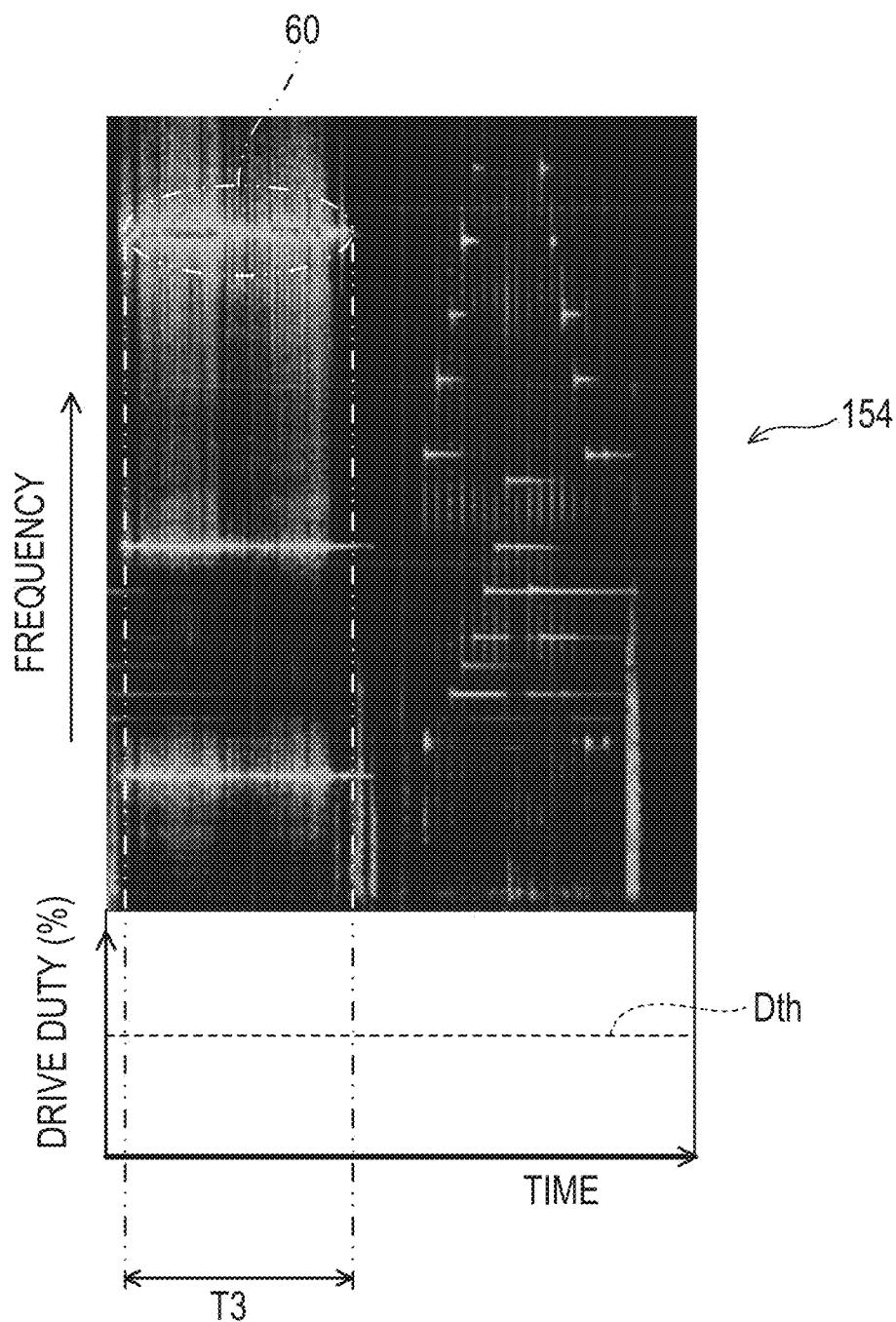
FIG. 17 is a diagram exemplifying the STFT data and the component operating state data.

In step S72, the arithmetic device 12 determines whether the generation time zone T3 of the abnormal sound selected in step S70 overlaps with the operating time zone T4 of the corresponding component of the abnormal sound. For example, when the abnormal sound selected in step S70 is the abnormal sound A, the corresponding component is the VSV as shown in FIG. 11. Therefore, the arithmetic device 12 determines whether the generation time zone T3 of the abnormal sound A overlaps with the operating time zone T4 of the VSV. When the generation time zone T3 of the abnormal sound A overlaps with the operating time zone T4 of the VSV as shown in FIGS. 14 and 15, the arithmetic device 12 determines YES in step S72. Further, as shown in FIG. 16, when the generation time zone T3 of the abnormal sound A does not overlap with the operating time zone T4 of the VSV, the arithmetic device 12 determines NO in step S72. Further, as shown in FIG. 17, when the VSV is not operating at all in the entire time range indicated by the STFT data 154, the operating time zone T4 of the VSV is not present. Therefore, the generation time zone T3 of the abnormal sound A does not overlap with the operating time zone T4 of the VSV. Therefore, in this case, the arithmetic device 12 determines NO in step S72.

When YES is determined in step S72, the arithmetic device 12 executes step S74. In step S74, the arithmetic device 12 displays the kind of the abnormal sound selected in step S70 on the monitor 18. For example, when the selected abnormal sound is the abnormal sound A, in step S74, "the abnormal sound A has been detected" is displayed on the monitor 18. On the other hand, when NO is determined in step S72, the arithmetic device 12 executes step S76. In step S76, the arithmetic device 12 does not display the kind of the abnormal sound selected in step S70 on the monitor 18.

In step S78, the arithmetic device 12 determines whether the processing for all the abnormal sounds identified by the trained model 52 is completed. When NO is determined in step S78, step S70 is executed again. In this case, in the next step S70, an abnormal sound in which the processing is not completed is selected. Therefore, steps S70 to S78 are repeated until the processing for all the abnormal sounds is completed. Therefore, when a plurality of abnormal sounds is identified by the trained model 52, solely the abnormal sounds determined to be YES in step S72 among the plurality of abnormal sounds are displayed on the monitor 18. When a plurality of abnormal sounds determined to be YES in step S72 is present, the above-mentioned abnormal sounds are displayed as a list on the monitor 18 in step S74. Further, when the abnormal sound determined to be YES in step S72 is not present, "Could not detect the abnormal sound." is displayed on the monitor 18 in step S74. When the processing for all the abnormal sounds identified by the trained model 52 is completed, the arithmetic device 12 ends the abnormal sound determination processing.

As described above, the arithmetic device 12 displays the kind of the abnormal sound being selected on the monitor 18 when the generation time zone T3 of the abnormal sound being selected and the operating time zone T4 of the corresponding component of the abnormal sound overlap, and does not display the kind of the abnormal sound being selected on the monitor 18 when the generation time zone T3 of the abnormal sound being selected and the operating time zone T4 of the corresponding component of the abnormal sound do not overlap. As a result, the kind of the abnormal sound being actually generated can be accurately displayed on the monitor 18. That is, in the trained model 52, an abnormal sound that is not actually generated may be identified. The abnormal sound identification device 100 of Example 2 extracts an abnormal sound in which the generation time zone T3 of the abnormal sound and the operating time zone T4 of the corresponding component of the abnormal sound overlap among the abnormal sounds identified by the trained model 52, and displays the abnormal sound on the monitor 18. As a result, it is possible to prevent the abnormal sound generated from the corresponding component from being erroneously displayed on the monitor 18 although the corresponding component is not operating. Therefore, with the abnormal sound identification device 100, it is possible to accurately display the kind of the abnormal sound that is actually generated.

Figure 18:
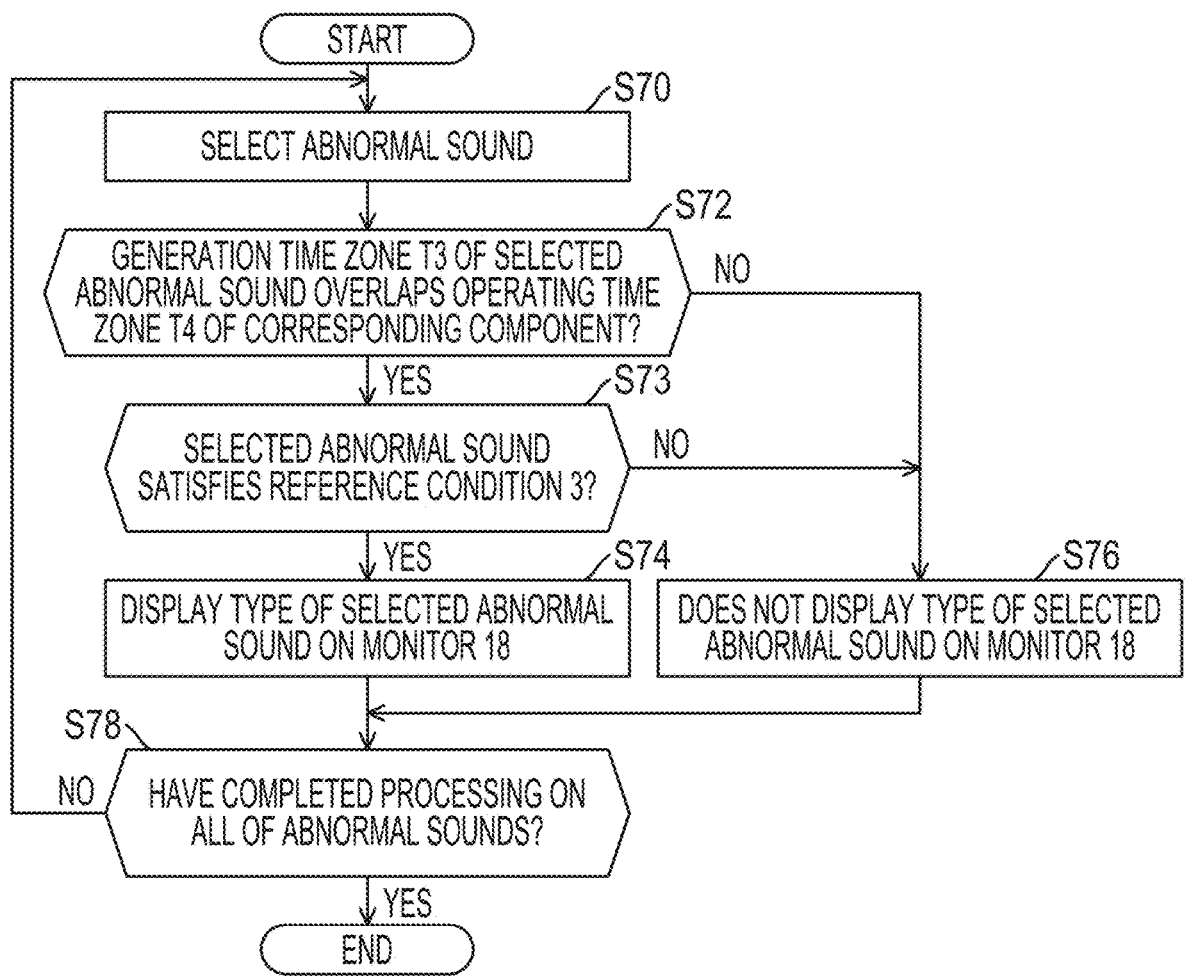
FIG. 18 is a flowchart showing determination processing of the modification example of Example 2.

In FIG. 13, when YES is determined in step S72, the selected abnormal sound is displayed on the monitor 18 in step S74. However, as shown in FIG. 18, step S73 that makes another determination between steps S72 and S74 may be present. In FIG. 18, although YES is determined in step S72, when the selected abnormal sound does not satisfy a reference condition 3 (that is, in a case of NO in step S73), the selected abnormal sound is not displayed in the monitor 18. As described above, although YES is determined in step S72, the selected abnormal sound may be not displayed on the monitor 18.

Figure 19:
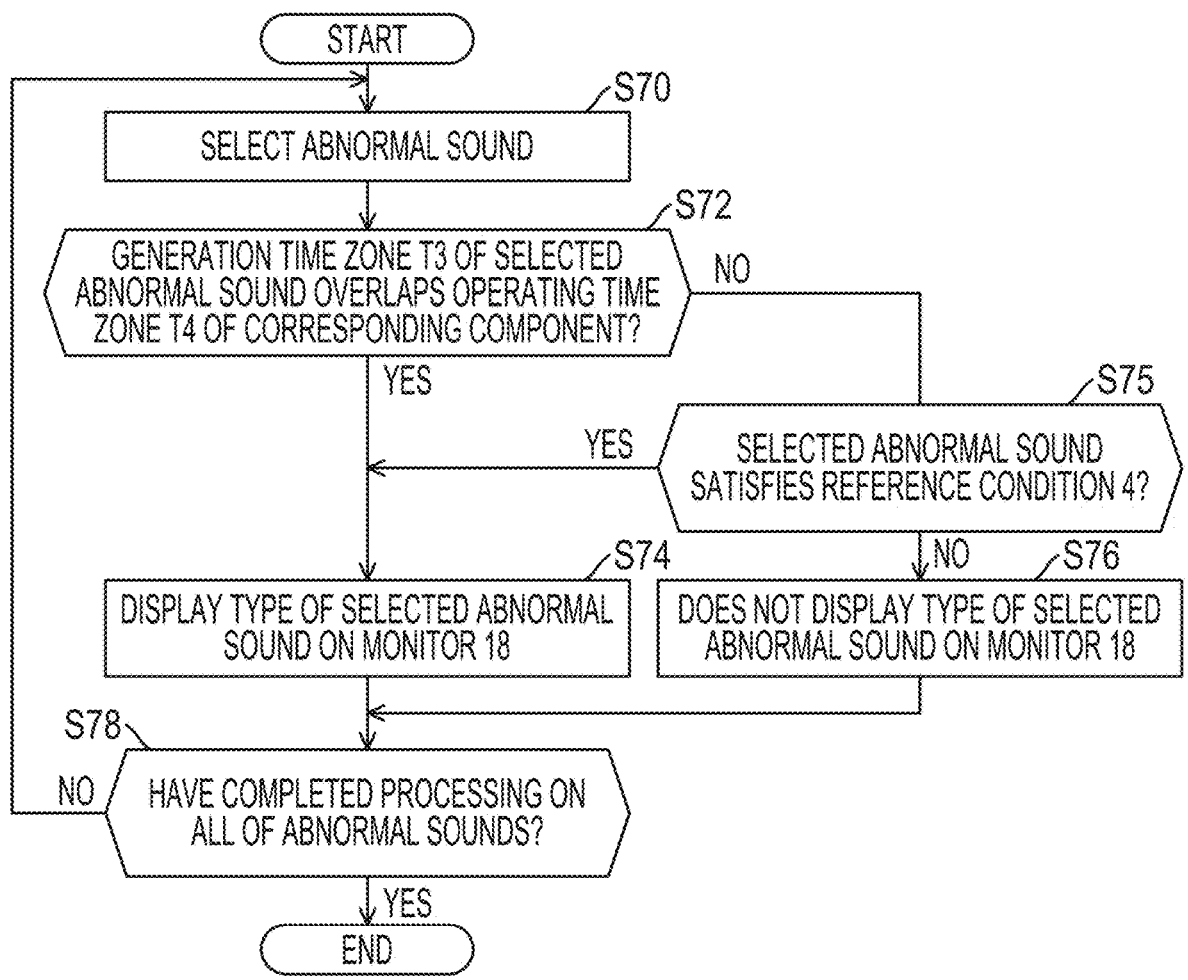
FIG. 19 is a flowchart showing determination processing of the modification example of Example 2.

Further, in FIG. 13, when NO is determined in step S72, the selected abnormal sound is not displayed on the monitor 18 in step S76. However, as shown in FIG. 19, step S75 that makes another determination between steps S72 and S76 may be present. In FIG. 19, although NO is determined in step S72, when the selected abnormal sound satisfies a reference condition 4 (that is, in a case of YES in step S75), the selected abnormal sound is displayed on the monitor 18. As described above, although NO is determined in step S72, the selected abnormal sound may be displayed on the monitor 18. Further, FIGS. 18 and 19 may be combined.

Further, in Examples 1 and 2 described above, the arithmetic device 12 displays the kind of the abnormal sound on the monitor 18. However, the arithmetic device 12 may cause another device to output the kind of the abnormal sound. For example, another device may output the kind of the abnormal sound via the network line 30.

Further, in Examples 1 and 2 described above, the STFT data 54 and 154 are image data. That is, the trained model 52 identifies the kind of the abnormal sound based on the STFT data 54 and 154 that are image data. However, the data format of the STFT data 54 and 154 is not limited to the image data. For example, the STFT data 54 and 154 may be data indicating a numerical value of the sound pressure level for each time and frequency.

Although the embodiments have been described in detail above, the above is merely an example and does not limit the scope of claims. The techniques described in the claims include various modifications and changes of the specific examples exemplified above. The technical elements described in the present specification or the drawings exhibit technical usefulness alone or in various combinations, and are not limited to the combinations described in the claims at the time of filing. Further, the techniques exemplified in the present specification or the drawings achieve a plurality of objectives at the same time, and achieving one of the objectives itself has technical usefulness.

What is claimed is:

1. An abnormal sound identification device comprising:
an arithmetic device configured to access a trained model of artificial intelligence; and
an output device,
wherein the arithmetic device is configured to
identify frequency-time data that indicates a temporal change of a frequency spectrum of a sound recorded in a vehicle,
specify a first time range and a second time range different from the first time range in the frequency-time data,
input the frequency-time data to the trained model to cause the trained model to identify one or more abnormal sounds generated in the first time range as a first abnormal sound based on the input frequency-time data and cause the trained model to identify one or more abnormal sounds generated in the second time range as a second abnormal sound based on the input frequency-time data, and
cause the output device to output a kind of the first abnormal sound with the kind not matching a kind of the second abnormal sound among the first abnormal sounds.

2. The abnormal sound identification device according to claim 1, wherein the arithmetic device is configured not to, in a case of causing the output device to perform output, cause the output device to output the kind of the first abnormal sound with the kind matching the kind of the second abnormal sound among the first abnormal sounds.

3. The abnormal sound identification device according to claim 1, wherein a sound pressure level of the sound in the first time range is higher than a sound pressure level of the sound in the second time range.

4. A non-transitory storage medium storing instructions that are executable in one or more arithmetic devices configured to access a trained model of artificial intelligence and connected to an output device, the instructions causing the one or more arithmetic devices to perform following functions comprising:
identifying frequency-time data that indicates a temporal change of a frequency spectrum of a sound recorded in a vehicle;
specifying a first time range and a second time range different from the first time range in the frequency-time data;
inputting the frequency-time data to the trained model to cause the trained model to identify one or more abnormal sounds generated in the first time range as a first abnormal sound based on the input frequency-time data and cause the trained model to identify one or more abnormal sounds generated in the second time range as a second abnormal sound based on the input frequency-time data; and
causing the output device to output a kind of the first abnormal sound with the kind not matching a kind of the second abnormal sound among the first abnormal sounds.

5. An abnormal sound identification device comprising:
an arithmetic device configured to access a trained model of artificial intelligence;
a storage device configured to store corresponding data in which a kind of an abnormal sound is associated with a component of a vehicle; and
an output device,
wherein the arithmetic device is configured to
identify frequency-time data indicating a temporal change in a frequency spectrum of a sound recorded in the vehicle and component operating state data indicating a temporal change of an operating state of the component of the vehicle during recording of the sound,
input the frequency-time data to the trained model to cause the trained model to identify an abnormal sound included in the sound as an identified abnormal sound based on the input frequency-time data, and
identify a corresponding component that is the component associated with the identified abnormal sound in the corresponding data, identify an operating time zone of the corresponding component based on the component operating state data of the corresponding component, and determine whether to cause the output device to output a kind of the identified abnormal sound in determination processing including determining whether a generation time zone of the identified abnormal sound and the operating time zone of the corresponding component overlap as at least one of determination elements.

* * * * *